United States Patent
Chung et al.

(10) Patent No.: US 10,277,961 B2
(45) Date of Patent: Apr. 30, 2019

(54) ELECTRONIC DEVICE, COMPANION DEVICE, AND METHOD OF OPERATING THE ELECTRONIC DEVICE

(71) Applicants: SAMSUNG ELECTRONICS CO., LTD., Suwon-si, Gyeonggi-do (KR); KOREAN ELECTRONICS TECHNOLOGY INSTITUTE, Seongnam-si, Gyeonggi-do (KR)

(72) Inventors: Ji-min Chung, Yongin-si (KR); Seung-woo Kum, Yongin-si (KR); Young-sun Ryu, Seongnam-si (KR); Tae-beom Lim, Yongin-si (KR)

(73) Assignee: Samsung Electronics, Co., Ltd., Suwon-si, Gyeonggi-do (KR)

( * ) Notice: Subject to any disclaimer, the term of this patent is extended or adjusted under 35 U.S.C. 154(b) by 3 days.

(21) Appl. No.: 15/218,260

(22) Filed: Jul. 25, 2016

(65) Prior Publication Data
US 2017/0155976 A1  Jun. 1, 2017

(30) Foreign Application Priority Data
Nov. 30, 2015  (KR) .................. 10-2015-0169284

(51) Int. Cl.
*H04N 21/8545* (2011.01)
*H04N 21/41* (2011.01)
(Continued)

(52) U.S. Cl.
CPC ........ *H04N 21/8545* (2013.01); *H04H 20/18* (2013.01); *H04H 60/80* (2013.01);
(Continued)

(58) Field of Classification Search
CPC ........... H04N 21/8545; H04N 21/4126; H04N 21/472; H04N 21/482; H04L 67/26; H04W 4/12; H04W 8/005; H04W 8/26
See application file for complete search history.

(56) References Cited

U.S. PATENT DOCUMENTS

2002/0055949 A1  5/2002  Shiomi et al.
2007/0121584 A1*  5/2007  Qiu .................. H04N 21/6125
370/352
(Continued)

FOREIGN PATENT DOCUMENTS

CA    2900485 A1 * 9/2014  ........... H04N 21/858
EP    2 759 931       7/2014
(Continued)

OTHER PUBLICATIONS

Search Report and Written Opinion dated Sep. 28, 2016 in counterpart International Patent Application No. PCT/KR2016/006925.
(Continued)

*Primary Examiner* — Randy A Flynn
(74) *Attorney, Agent, or Firm* — Nixon & Vanderhye P.C.

(57) ABSTRACT

An electronic device includes a communicator comprising communication circuitry; and a controller configured to recognize a trigger for an execution request of an application for interoperating with a companion screen and to transmit a notification message including a key identifying the application of a companion device and information for calling the application to a notification server that provides a notification service with respect to the application to the companion device through the communication circuitry of the communicator.

19 Claims, 20 Drawing Sheets

(51) Int. Cl.

| | | |
|---|---|---|
| *H04N 21/436* | (2011.01) | |
| *H04N 21/443* | (2011.01) | |
| *H04N 21/462* | (2011.01) | |
| *H04N 21/472* | (2011.01) | |
| *H04N 21/475* | (2011.01) | |
| *H04N 21/482* | (2011.01) | |
| *H04N 21/643* | (2011.01) | |
| *H04N 21/81* | (2011.01) | |
| *H04W 8/00* | (2009.01) | |
| *H04W 48/14* | (2009.01) | |
| *H04W 4/12* | (2009.01) | |
| *H04L 29/08* | (2006.01) | |
| *H04H 60/80* | (2008.01) | |
| *H04H 60/82* | (2008.01) | |
| *H04H 20/18* | (2008.01) | |

(52) U.S. Cl.
CPC ............ *H04H 60/82* (2013.01); *H04L 67/26* (2013.01); *H04N 21/4126* (2013.01); *H04N 21/43615* (2013.01); *H04N 21/4622* (2013.01); *H04N 21/472* (2013.01); *H04N 21/4758* (2013.01); *H04N 21/482* (2013.01); *H04N 21/64322* (2013.01); *H04N 21/8173* (2013.01); *H04W 4/12* (2013.01); *H04W 48/14* (2013.01); *H04N 21/4122* (2013.01); *H04N 21/4433* (2013.01); *H04W 8/005* (2013.01)

(56) References Cited

U.S. PATENT DOCUMENTS

| | | | |
|---|---|---|---|
| 2011/0131520 A1* | 6/2011 | Al-Shaykh | H04N 21/41407 715/772 |
| 2011/0321107 A1 | 12/2011 | Banks | |
| 2012/0158511 A1* | 6/2012 | Lucero | H04N 21/8547 705/14.64 |
| 2012/0174155 A1 | 7/2012 | Mowrey et al. | |
| 2012/0202479 A1 | 8/2012 | Sugitani et al. | |
| 2012/0240177 A1* | 9/2012 | Rose | H04N 21/252 725/116 |
| 2013/0055323 A1* | 2/2013 | Venkitaraman | H04N 21/4126 725/82 |
| 2013/0204967 A1 | 8/2013 | Seo et al. | |
| 2014/0181887 A1* | 6/2014 | Moon | H04N 21/23617 725/133 |
| 2014/0337902 A1 | 11/2014 | Holland | |
| 2014/0359057 A1* | 12/2014 | Hensgen | H04N 21/4307 709/217 |
| 2015/0189486 A1 | 7/2015 | Lee et al. | |
| 2016/0316248 A1* | 10/2016 | Hao | H04N 21/41407 |

FOREIGN PATENT DOCUMENTS

| | | |
|---|---|---|
| JP | 2006-246064 | 9/2006 |
| JP | 2013-085020 | 5/2013 |
| JP | 2015-060429 | 3/2015 |
| KR | 10-2010-0095860 | 9/2010 |
| KR | 10-2012-0071451 | 7/2012 |
| WO | 2011/156135 | 12/2011 |
| WO | WO 2014/100926 | 7/2014 |

OTHER PUBLICATIONS

European Search Report dated Apr. 9, 2018 for EP Application No. 16870888.1.
"Hybrid Broadcast Broadband TV", Jul. 8, 2015 pp. 1-254; XP014249205.
"DIAL Discovery and Launch Protocol Specification" Version 1.7.7; May 20, 2014, XP055462858.
Digital Video Broadcasting (DVB) Companion Screens and Streams; Part 3: Discovery, Oct. 6, 2015; XP017846475.
Digital Video Broadcasting (DBV); GEM Companion Screen Service Framework; May 12, 2015; XP017846137.

* cited by examiner

FIG. 4

| FIRST KEY | FIRST COMPANION DEVICE, FIRST CS APP ID |
|---|---|
| SECOND KEY | FIRST COMPANION DEVICE, SECOND CSS APP ID |
| THIRD KEY | SECOND COMPANION DEVICE, SECOND CSS APP ID |

| Key (21) | URI (22) | UI INFORMATION :"WILL YOU PARTICIPATE IN VOTING?" (23) |

FIG. 6
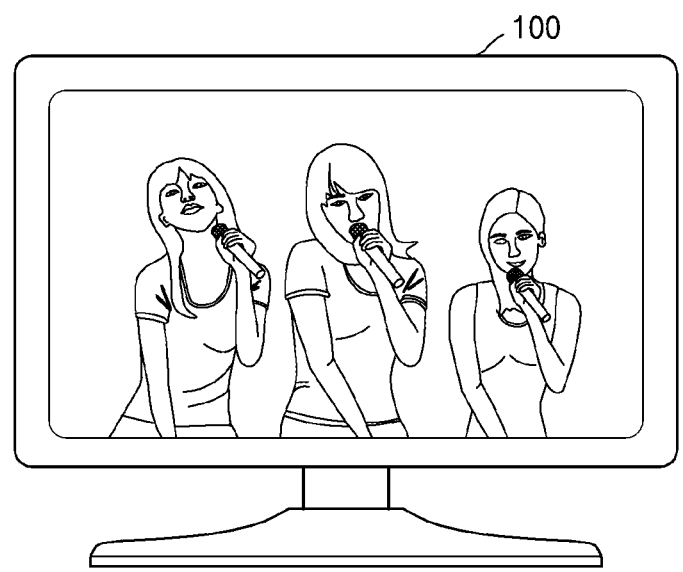
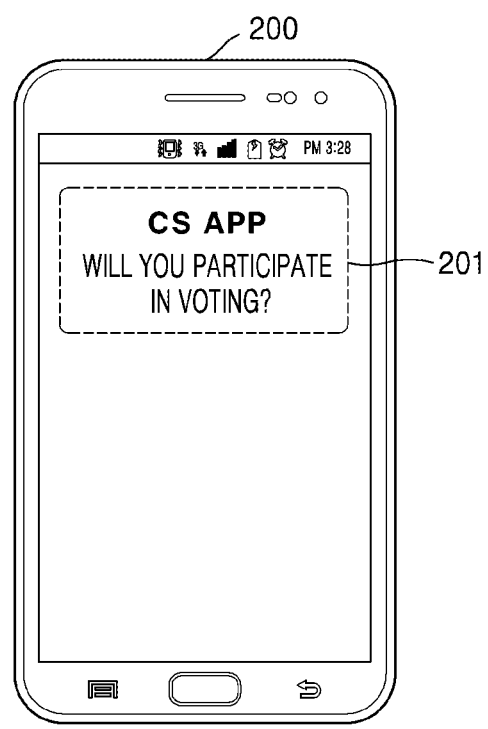

FIG. 9

| ELECTRONIC DEVICE | |
|---|---|
| FIRST KEY | FIRST COMPANION DEVICE ID, FIRST CS APP ID |
| SECOND KEY | FIRST COMPANION DEVICE ID, SECOND CS APP ID |
| THIRD KEY | SECOND COMPANION DEVICE ID, FIRST CS APP ID |

ELECTRONIC DEVICE, COMPANION DEVICE, AND METHOD OF OPERATING THE ELECTRONIC DEVICE

CROSS-REFERENCE TO RELATED APPLICATION

This application is based on and claims priority under 35 U.S.C. § 119 to Korean Patent Application No. 10-2015-0169284, filed on Nov. 30, 2015, in the Korean Intellectual Property Office, the disclosure of which is incorporated by reference herein in its entirety.

BACKGROUND

1. Field

The present disclosure relates to an electronic device, a companion device, and a method of operating the electronic device, and for example, to an electronic device that interoperates with an electronic device that receives audio/video (A/V) content and a companion device used as a companion screen, the companion device, and a method of operating the electronic device.

2. Description of Related Art

Along with developments in communication technology and various media, a broadcasting communication industry has rapidly developed. A television (TV) device has performed a function of receiving a broadcast signal sent from a broadcasting station only in a unidirectional direction and displaying a broadcast image. However, a current TV device provides a function of outputting not only the broadcast image received from the broadcasting station but also various types of A/V content and additional services. A technology of enabling the TV device to interoperate with peripheral devices has also been developed.

Therefore, there is a need for a method of efficiently enabling a terminal receiving a broadcast signal to interoperate with peripheral devices.

SUMMARY

An electronic device that interoperates with an electronic device that receives audio/video (A/V) content and a companion device used as a companion screen, the companion device, and a method of operating the electronic device are provided.

Additional aspects will be set forth in part in the description which follows and, in part, will be apparent from the description.

According to an aspect of an example embodiment, an electronic device includes a communicator comprising communication circuitry; and a controller configured to recognize a trigger for an execution request of an application for interoperating with a companion screen and to transmit a notification message including a key identifying the application of a companion device and information for calling the application to a notification server that provides a notification service with respect to the application to the companion device through the communication circuitry of the communicator.

The controller may be further configured to recognize, as the trigger, receiving of information regarding the application including an ID of the application and the information for calling the application or receiving of an input requiring the electronic device to use the companion screen.

The controller may be further configured to select the key included in the notification message from among a plurality of previously stored keys based on the ID of the application.

The information for calling the application included in the notification message may include address information for accessing resources on a network.

The controller may be further configured to receive the key for identifying the application of the companion device from the companion device through the communication circuitry of the communicator.

The controller may be further configured to receive a discovery packet from the companion device, to transmit a response packet to the companion device in response to the discovery packet, and to receive the key from the companion device, through the communication circuitry of the communicator.

The controller may be further configured to execute a second application interoperable with the application, and the second application may be configured to recognize the trigger, to generate the notification message, and to transmit the notification message to the notification server.

The second application may be further configured to discover a second companion device that is executing a launcher and to request the launcher of the discovered second companion device to execute the application.

The controller may be further configured to transmit the notification message to a service server to allow the notification message to be transmitted to the notification server, and the service server may be configured to convert the notification message received from the controller to a format based on a protocol of the notification server and to transmit the converted notification message to the notification server.

The controller may be further configured to receive audio/video (A/V) content through the communication circuitry of the communicator, and the information for calling the application may include address information for accessing resources on a network for receiving a service in association with the A/V content.

According to an aspect of another example embodiment, a companion device includes a communicator comprising communication circuitry; and a controller configured to register a notification service allowing a notification with respect to an application for using the companion device as a companion screen in a notification server through the communication circuitry of the communicator, to receive a key identifying the application of the companion device from the notification server, to discover an electronic device which is to provide the notification, and to transmit the key to the discovered electronic device.

The companion device may further include an output interface, wherein the controller is further configured to execute the application, and the application may be configured to discover one or more electronic devices, and to output a user interface (UI) for selecting the electronic device which is to provide the notification from among the discovered one or more electronic devices through the output interface.

The controller may be further configured to receive a notification message with respect to the application from the notification server through the communication circuitry of the communicator and to output a UI for selecting whether to execute the application through the output interface.

If the controller executes the application based on a user input through the UI, the application may be further configured to interoperate with the electronic device that transmits the notification message.

The notification message may include address information for accessing resources on a network for calling the application, and the controller may be further configured to execute the application by accessing the address information.

According to an aspect of another example embodiment, a method of operating an electronic device includes recognizing a trigger for an execution request of an application for interoperating with a companion screen; and transmitting a notification message including a key identifying the application of a companion device and information for calling the application to a notification server.

The method may further include: selecting the key from among a plurality of previously stored keys based on the ID of the application and including the key in the notification message.

The method may further include: executing a second application interoperable with the application; recognizing the trigger, wherein the recognizing is performed by the second application; and generating the notification message and transmitting the notification message to the notification server, wherein the generating and the transmitting is performed by the second application.

The method may further include: discovering a second companion device that is executing a launcher, wherein the discovering is performed by the second application; and requesting the launcher of the discovered second companion device to execute the application, wherein the requesting is performed by the second application.

BRIEF DESCRIPTION OF THE DRAWINGS

These and/or other aspects will become apparent and more readily appreciated from the following detailed description, taken in conjunction with the accompanying drawings, in which like reference numerals refer to like elements, and wherein:

FIG. 4 is a table illustrating an example of keys stored in an electronic device, according to some example embodiments;

FIG. 5 is a diagram illustrating an example of a notification message transmitted by an electronic device to a notification server, according to some example embodiments;

FIG. 6 is a diagram illustrating an example of an electronic device and a companion device receiving a notification message, according to some example embodiments;

FIG. 9 is a table illustrating an example of relationship information stored in a notification server, according to some example embodiments;

DETAILED DESCRIPTION

Most of the terms used herein are general terms that have been widely used in the technical art to which the present disclosure pertains. However, some of the terms used herein may be created to reflect the intentions of technicians in this art, precedents, or new technologies. Also, some of the terms used herein may be arbitrarily chosen by the present applicant. In this case, these terms are defined in detail below. Accordingly, the specific terms used herein should be understood based on the unique meanings thereof and the whole context of the present disclosure.

In the present description, it should be understood that terms such as 'including' or 'having,' etc., are intended to indicate the existence of the features, numbers, steps, actions, components, parts, or combinations thereof disclosed in the description, and are not intended to preclude the possibility that one or more other features, numbers, steps, actions, components, parts, or combinations thereof may exist or may be added. Also, terms such as 'unit' or 'module', etc., should be understood as a unit that processes at least one function or operation and that may be embodied in a hardware manner, a software manner, or a combination of the hardware manner and the software manner. As used herein, the term "and/or" includes any and all combinations of one or more of the associated listed items. Expressions such as "at least one of," when preceding a list of elements, modify the entire list of elements and do not modify the individual elements of the list.

Figure 1:
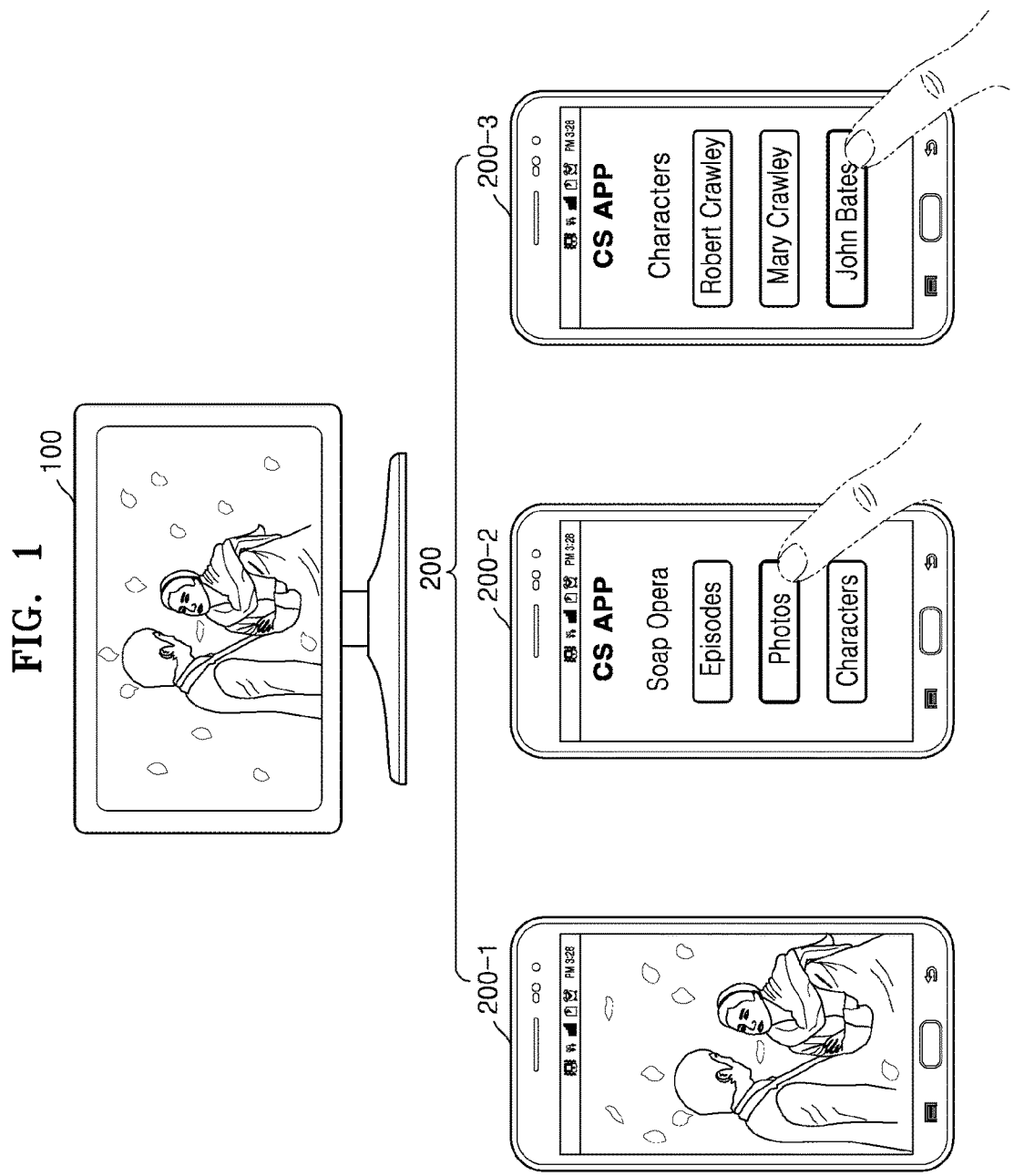
FIG. 1 is a diagram illustrating an example electronic device and a companion device interoperating with the electronic device, according to some example embodiments.

FIG. 1 is a diagram illustrating an example electronic device 100 and a companion device 200 interoperating with the electronic device 100, according to some example embodiments.

Referring to FIG. 1, the electronic device 100 may receive audio/video (A/V) content. The A/V content may be real-time broadcasting content or non-real-time A/V content. For example, the non-real-time A/V content may be A/V content provided via a video on demand (VOD) service. The electronic device 100 may receive the A/V content from an A/V content provider. For example, the A/V content provider may be a broadcasting service provider, a VOD service provider, etc.

The electronic device 100 may be connected to a broadcasting network and Internet. For example, the broadcasting network may be digital video broadcasting terrestrial (DVB-T), DVB-satellite (S), or DVB-cable (C), etc. but is not limited thereto. The electronic device 100 may receive the A/V content through the broadcasting network and Internet. The electronic device 100 may be a hybrid terminal supporting receiving of the A/V content through the broadcasting network and Internet.

The electronic device 100 may be a TV, a set-top box, or a personal video recorder (PVR), etc. but is not limited thereto. The electronic device 100 includes a display in FIG. 1. However, when the electronic device 100 is the set-top box or the PVR, the electronic device 100 may not include the display and may be connected to a display device outputting the A/V content by wire or wirelessly. When the electronic device 100 includes the display, the display of the electronic device 100 may output the received A/V content. When the electronic device 100 does not include the display, the electronic device 100 may allow the display device connected to the electronic device 100 to output the A/V content.

The A/V content provider providing the A/V content to the electronic device 100 may further provide a service in association with the A/V content. For example, when the A/V content is a soap opera, the A/V content provider may provide episode information in association with the soap opera, photos, character information, etc. as the service. When the A/V content is a sports game, the A/V content provider may provide player information related to the sports game, game record information, etc. as the service. In addition, providing of an advertisement in association with the A/V content, brokerage of products in association with the A/V content, providing of an event in association with the A/V content, a function of editing the A/V content, etc. may also be services provided. However, the service in association with the A/V content is not limited to the examples. The A/V content provider may provide various services along with the A/V content. The electronic device 100 may output the A/V content and may further output the service in association with the A/V content.

One companion device 200 or a plurality of companion devices 200 may be used as a companion screen (CS) that interoperates with the electronic device 100. The companion device 200 may be a personal device such as a mobile phone, a tablet personal computer (PC), etc. but is not limited thereto. The electronic device 100 may be referred to as a primary device (PD). The companion device 200 may be referred to as a CD. Although the companion device 200 includes three companion devices, i.e. first through third companion devices 200-1, 200-2, and 200-3, as illustrated in FIG. 1, the number of companion devices interoperating with the electronic device 100 is not limited thereto. The companion device 200 may be any type of electronic device including a processor and a display, capable of interoperating with the electronic device 100, and may be used as the CS. The companion device 200 may be referred to as an external device, a peripheral device, or a CS device.

Interoperating between the electronic device 100 and the companion device 200 may mean that the electronic device 100 and the companion device 200 are connected to each other and operate together. It may also mean that a screen of the companion device 200 is used as a CS of the electronic device 100.

For example, the electronic device 100 and the companion device 200-1 may output the same A/V content. Alternatively, the electronic device 100 may output the A/V content, and the companion devices 200-2 and 200-3 may output the service in association with the A/V content.

For example, it is assumed in FIG. 1 that the electronic device 100 currently receives and outputs a soap opera as A/V content. The first companion device 200-1 may output the same A/V content as that output by the electronic device 100. That is, a screen of the companion device 200-1 may be the same as a screen of the electronic device 100. The second companion device 200-2 may output a user interface (UI) for selecting episode information, photos, character information, etc. in association with the soap opera. If the second companion device 200-2 receives a user input that selects photos through the UI, the second companion device 200-2 may be switched to a service screen providing the photo in association with the soap opera. The third companion device 200-3 may output a UI for selecting characters in association with the soap opera. If the third companion device 200-3 receives a user input that selects characters through the UI, the third companion device 200-3 may be switched to a service screen introducing selected characters.

The companion devices 200-2 and 200-3 may output the service in association with the A/V content so that users may watch A/V content that is not hidden by the service in association with the A/V content through the electronic device 100. Users who watch the A/V content may desire different services. The companion devices 200-2 and 200-3 may output other services through interaction with users.

The electronic device 100 may execute an application for interoperation with the companion device 200. An example of the application may be a hybrid broadcast broadband TV (HbbTV) application following an HbbTV 2.0 standard but is not limited thereto.

Hereinafter, the "HbbTV application" in the description is an application executed by the electronic device 100, refers to all types of applications available for interoperation with the companion device 200, and is not limited to a specific application.

The companion device 200 may execute a CS application for interoperation with the electronic device 100. The CS application may interoperate with the electronic device 100 or may be interoperable with the application executed by the electronic device 100. The companion device 200 may execute the CS application to interoperate with the electronic device 100. That is, the companion device 200 may execute the CS application and thus may be used as the CS of the electronic device 100. The CS application may be an application that enables the companion device 200 to be used as the CS of the electronic device 100.

The CS application of the companion device 200 may communicate with the application of the electronic device 100. That is, the companion device 200 and the electronic device 100 may use application-to-application communication. The companion device 200 may be provided with the service in association with the A/V content through the CS application. The companion device 200 may be provided with the service in association with the A/V content through application to application communication with the application of the electronic device 100 or from the A/V content provider.

Hereinafter, the "CS application" in the description is an application executed by the companion device 200, refers to all types of applications that interoperate with the electronic device 100 or that may interoperate with the application of the electronic device 100, and is not limited to a specific application.

However, since the companion device 200 is a personal device, the companion device 200 may execute another application or may not execute the CS application like terminating the CS application. That is, the companion device 200 may not always interoperate with the electronic device 100. Thus, the electronic device 100 may need a method of requesting the companion device 200 that may be used as the CS to execute the CS application. This will be described in detail below.

Figure 2:
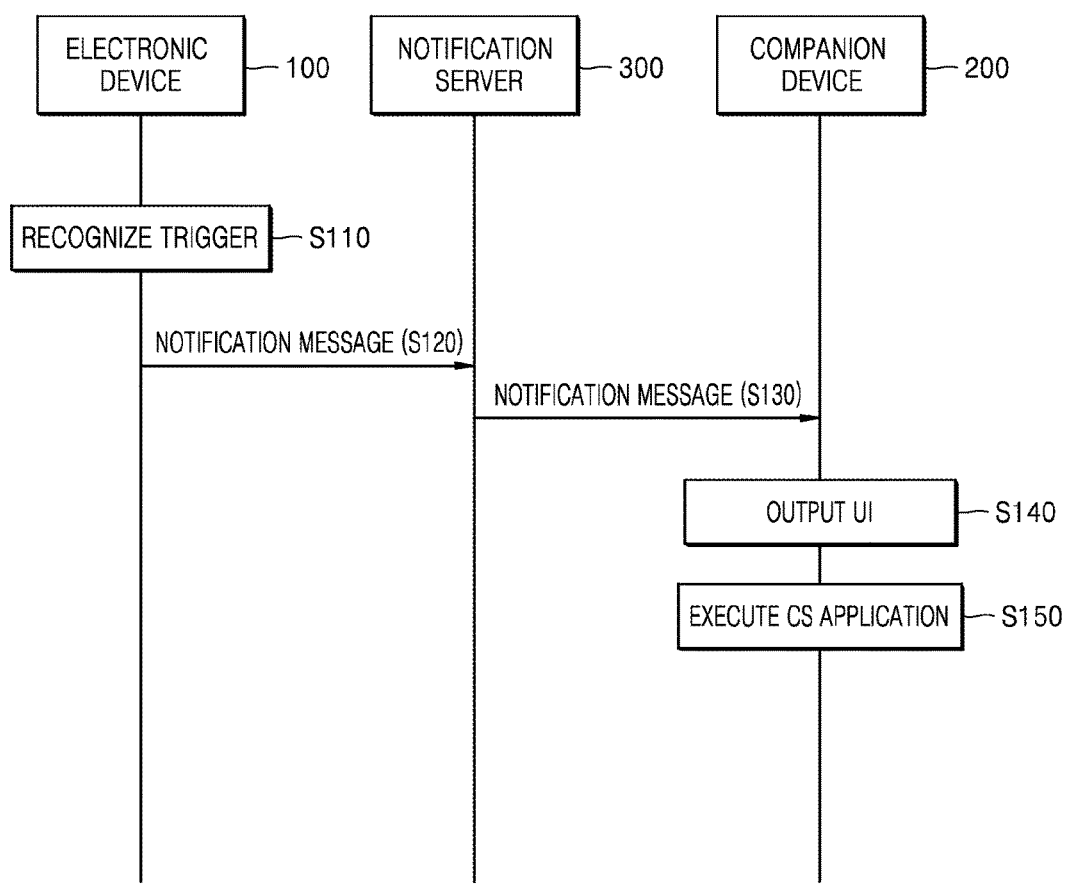
FIG. 2 is a flowchart illustrating an example method in which an electronic device transmits a notification message to a companion device, according to some example embodiments.

FIG. 2 is a flowchart illustrating an example method in which the electronic device 100 transmits a notification message to the companion device 200, according to some example embodiments.

Referring to FIG. 2, the electronic device 100 may recognize a trigger for an execution request of a CS application (S110). The electronic device 100 may recognize the trigger for the execution request of the CS application for interoperation with a CS. The electronic device 100 may recognize various cases of requiring interoperation with the CS as the trigger for the execution request of the CS application.

The electronic device 100 may receive A/V content and application information from an A/V content provider. A signal including the A/V content and the application information received by the electronic device 100 may be a broadcasting signal. The application information may be an application information table (AIT). The application information may include at least one of information regarding an HbbTV application and information regarding the CS application.

As an example, if the application information includes the information regarding the CS application, the electronic device 100 may recognize the trigger for the execution request of the CS application. That is, the electronic device 100 may recognize receiving of the information regarding the CS application from the A/V content provider as the trigger for the execution request of the CS application.

The information regarding the CS application may include an identifier of the CS application. The information regarding the CS application may further include information for calling the CS application. The information for calling the CS application may include address information for accessing resources on a network. For example, the address information may be a uniform resource identifier (URI) or a uniform resource locator (URL), etc. but is not limited thereto. The information for calling the CS application may include information for receiving a service in association with the A/V content. The CS application may access resources on the network by using the address information included in the information for calling the CS application to receive the service in association with the A/V content.

As another example in which the electronic device 100 recognizes the trigger for the execution request of the CS application, the electronic device 100 may receive a user input requiring the electronic device 100 to use the CS. The electronic device 100 may execute the HbbTV application and may receive the user input through the HbbTV application. The electronic device 100 may receive the user input through various methods and via various input devices such as a remote controller, a touch screen, etc.

The electronic device 100 that has recognized (S110) the trigger for the execution request of the CS application may transmit the notification message to a notification server 300 (S120). The notification message may include a key identifying the CS application of the companion device 200 and the information for calling the CS application.

The key may be information identifying the CS application of the companion device 200 shared by the notification server 300 and the companion device 200. The key may be stored in the electronic device 100 in advance.

The electronic device 100 may acquire the information for calling the CS application included in the notification message as follows. For example, the electronic device 100 may acquire the information for calling the CS application from the information regarding the CS application included in the application information received by the electronic device 100.

As another example, the information regarding the HbbTV application included in the application information received by the electronic device 100 may include information for calling the HbbTV application. The information for calling the HbbTV application may include the address information for accessing resources on the network. The electronic device 100 may call the HbbTV application by using the address information. However, if the electronic device 100 receives the user input requiring the electronic device 100 to use the CS, the electronic device 100 may acquire the information for calling the CS application based on the information for calling the HbbTV application. The electronic device 100 may acquire the information for calling the HbbTV application or modified information as the information for calling the CS application.

The notification server 300 that has received (S120) the notification message may transmit the notification message to the companion device 200 based on the key identifying the CS application of the companion device 200 included in the notification message (S130).

The companion device 200 that has received the notification message may output a UI for selecting whether to execute the CS application (S140). The companion device 200 may output the UI by using various methods of notifying a user of the execution request of the CS application. The UI output by the companion device 200 may be diverse such as a graphic user interface (GUI), a sound UI, etc. and is not limited to a special format. For example, the UI may include text, an image, a sound signal, etc. The UI may include default text "Will you execute the CS application?" Alternatively, the notification message may further include UI information regarding the UI, in addition to the key identifying the CS application and the information for calling the CS application. For example, the UI information may further include the text, the image, the sound signal, etc. that are to be included in the UI.

The companion device 200 may receive a user input selecting an execution of the CS application through the UI. If the companion device 200 receives the user input, the companion device 200 may execute the CS application based on the information for calling the CS application included in the notification message (S150). The companion device 200 may execute the CS application and may access resources on the network indicated by the information for calling the CS application.

According to some embodiments, the electronic device 100 may not need to discover the companion device 200 to request the execution of the CS application after recognizing the trigger for the execution request of the CS application. The electronic device 100 transmits the notification message to the notification server 300, and thus the electronic device 100 may not need to discover the companion device 200. Discovery may include one or more operations of discovering the companion device 200 to request the execution of the CS application near the electronic device 100. The companion device 200 may receive the notification message from the electronic device 100 irrespective of whether the companion device 200 is executing the CS application or irrespective of whether the companion device 200 is near the electronic device 100.

Figure 3:
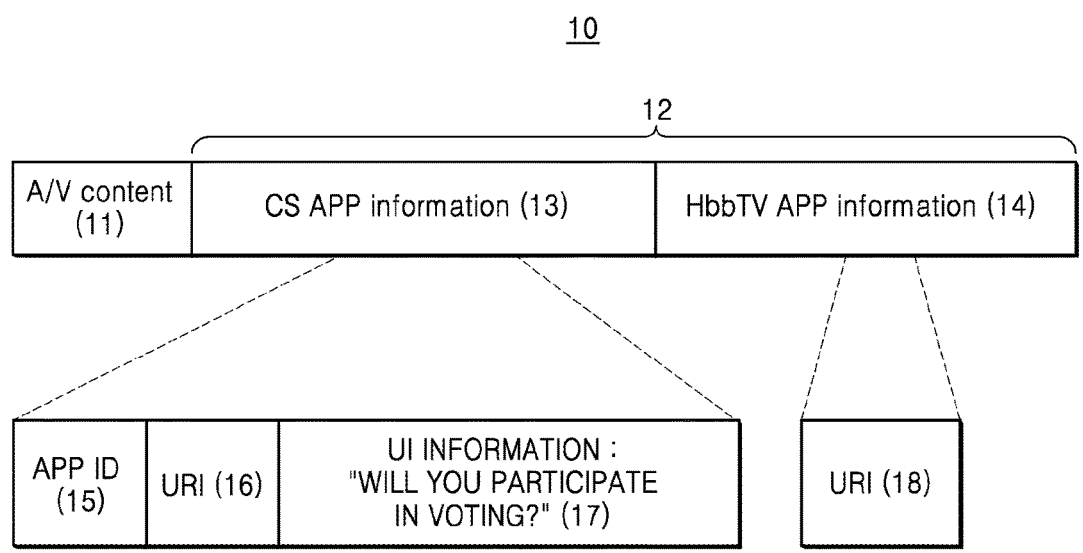
FIG. 3 is a diagram illustrating an example of a signal received by an electronic device from an audio/video (A/V) content provider, according to some example embodiments.

FIG. 3 illustrates an example of a signal 10 received by an electronic device from an A/V content provider, according to some example embodiments.

Referring to FIG. 3, the signal 10 received by the electronic device may include A/V content 11 and application information 12. The application information 12 may include at least one of information 13 regarding a CS application and information 14 regarding an HbbTV application.

The information 13 regarding the CS application may include an ID 15 of the CS application and information 16 for calling the CS application. The information 13 regarding the CS application may further include UI information 17 regarding a UI (see S140 of FIG. 2) that is to be output by a companion device that receives a notification message. For example, the UI information 17 may be text "Will you participate in voting?"

The information 14 regarding the HbbTV application may include information 18 for calling the HbbTV application.

However, FIG. 3 merely illustrates the signal 10 as an example. A format or a structure of the signal 10 is not limited to the example of FIG. 3.

FIG. 4 is a table illustrating an example of keys stored in an electronic device, according to some example embodiments.

Referring to FIG. 4, the electronic device may store the plurality of keys. Each key may be information identifying a CS application of a companion device shared by the electronic device, a notification server, and the companion device. For example, a first key may identify a first CS application of a first companion device, a second key may identify a second CS application of the first companion device, and a third key may identify the second CS application of a second companion device. That is, each key may identify a specific CS application of a specific companion device.

Referring to FIGS. 2 through 4, the electronic device 100 may recognize receiving of the information 13 regarding the CS application as the trigger for the execution request of the CS application (S110). The electronic device 100 may select a key included in the notification message based on the ID 15 of the CS application included in the information 13 regarding the CS application.

For example, it is assumed that the ID 15 of the CS application is an ID of the second CS application. The electronic device 100 may select the second key and the third key. That is, the electronic device 100 may generate a plurality of notification messages by using different keys. The electronic device 100 may generate a first notification message including the second key and the information 16 for calling the CS application and the UI information 17 included in the information 13 regarding the CS application. The electronic device 100 may generate a second notification message including the third key and the information 16 for calling the CS application and the UI information 17. The electronic device 100 may transmit the first notification message and the second notification message to the notification server 300.

The electronic device 100 may recognize receiving of the user input requiring the electronic device 100 to use the CS as the trigger for the execution request of the CS application (S110). If the electronic device 100 does not receive the information 13 regarding the CS application, the electronic device 100 may select the CS application whose execution is to be requested. For example, the electronic device 100 may select the CS application in various ways such as a user input, a preset scheme, etc. For example, if the electronic device 100 selects the first CS application, the electronic device 100 may generate the notification message including the first key. The electronic device 100 may acquire the information for calling the CS application based on the information 18 for calling the HbbTV application and include the information in the notification message.

FIG. 5 is a diagram illustrating an example of a notification message 20 transmitted by an electronic device to a notification server, according to some example embodiments.

Referring to FIG. 5, the notification message 20 may include a key 21 identifying a CS application of a companion device and information 22 for calling the CS application. The information 22 for calling the CS application may correspond to the information 16 for calling the CS application included in the application information 12 of FIG. 3 received by the electronic device and the information 18 for calling an HbbTV application. The notification message 20 may further include UI information 23. The UI information 23 may correspond to the UI information 17 included in the application information 12 of FIG. 3 received by the electronic device.

However, FIG. 5 merely illustrates the example of the notification message 20. A format or a structure of the notification message 20 is not limited to the example of FIG. 5.

FIG. 6 is a diagram illustrating an example of the electronic device 100 and the companion device 200 receiving a notification message, according to some example embodiments.

Referring to FIG. 6, A/V content output by the electronic device 100 may be a music broadcast program. The electronic device 100 may recognize a trigger for an execution request of a CS application and may transmit the notification message to a notification server. The notification server may transmit the notification message to the companion device 200.

The companion device 200 receiving the notification message may output a UI 201 for selecting whether to execute the CS application. The UI 201 output by the companion device 201 may be a text message format notifying that a user may participate in voting related to the music broadcast program that is being output by the electronic device 100 through the CS application. The UI 201 of FIG. 6 may include text "Will you participate in voting?" The UI information 23 of FIG. 5 included in the notification message received by the companion device 200 may include the text "Will you participate in voting?" That is, the companion device 200 may output the UI 201 based on the UI information included in the notification message.

Figure 7:
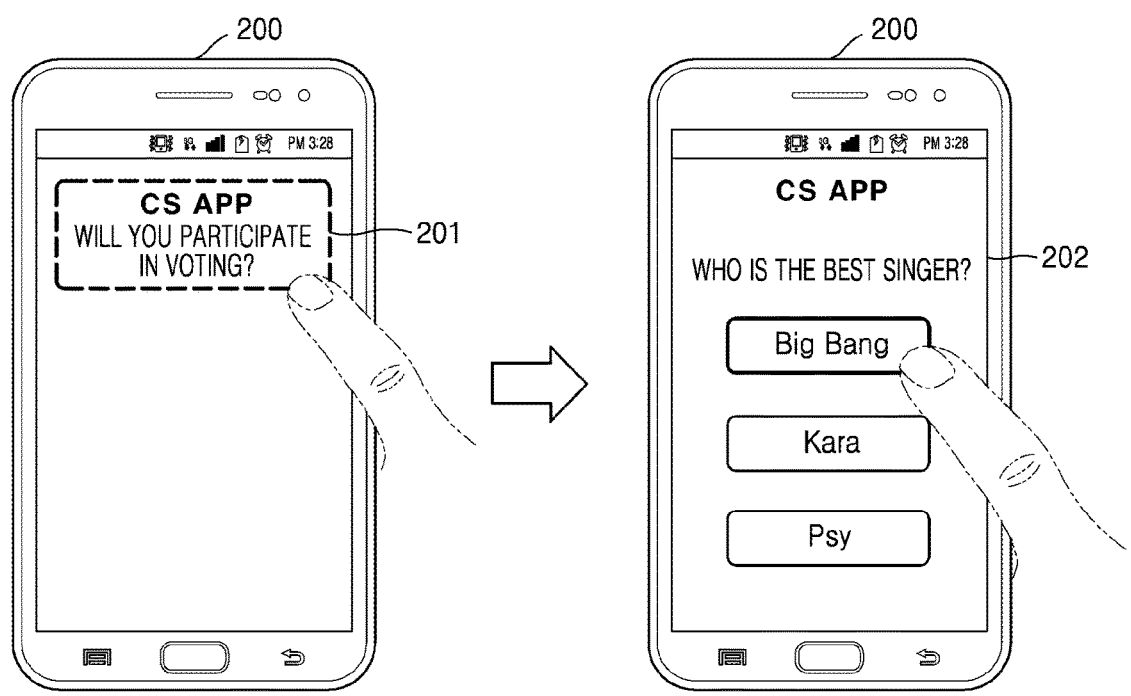
FIG. 7 is a diagram illustrating an example in which a companion device receiving a notification message executes a companion screen (CS) application, according to some example embodiments.

FIG. 7 is a diagram illustrating an example in which the companion device 200 receiving a notification message executes a CS application, according to some example embodiments.

Referring to FIG. 7, the companion device 200 receiving the notification message may output the UI 201 for selecting whether to execute the CS application. The companion device 200 may receive a user input selecting an execution of the CS application through the UI 201. In FIG. 7, the companion device 200 may receive a user touch on the UI 201 as a user input of selecting the execution of the CS application. However, this is merely an example. The user input of selecting the execution of the CS application may be implemented in various ways such as via a touch, a slide, etc.

The companion device 200 that receives the user input of selecting the execution of the CS application through the UI 201 may execute the CS application. The companion device 200 may execute the CS application based on information for calling the CS application included in the notification message. The companion device 200 may execute the CS application and may automatically access resources on a network indicated by the information for calling the CS application. Thus, as shown in FIG. 7, a screen of the companion device 200 may be automatically switched through the user input via the UI 201.

The companion device 200 whose screen is switched by the execution of the CS application may receive a vote for selecting singers in association with the A/V content that is the music broadcast program as a service. For example, the CS application of the companion device 200 may output a UI 202 for a user to vote for singers (Big Bang, Kara, and Psy). The companion device 200 may receive a user input of selecting the singers (Big Bang). As described above, the CS application of the companion device 200 may provide the service in association with the A/V content.

FIGS. 6 and 7 illustrate an example in which the companion device 200 outputs the UI 201 for selecting whether to execute the CS application and executes the CS application, and the example of the service in association with the A/V content provided by the executed CS application.

A key identifying a CS application of a companion device including a notification message will now be described. The key is information shared by an electronic device, a notification server, and the companion device, and thus a process of sharing the key before the electronic device transmits the notification message may be necessary.

Figure 8:
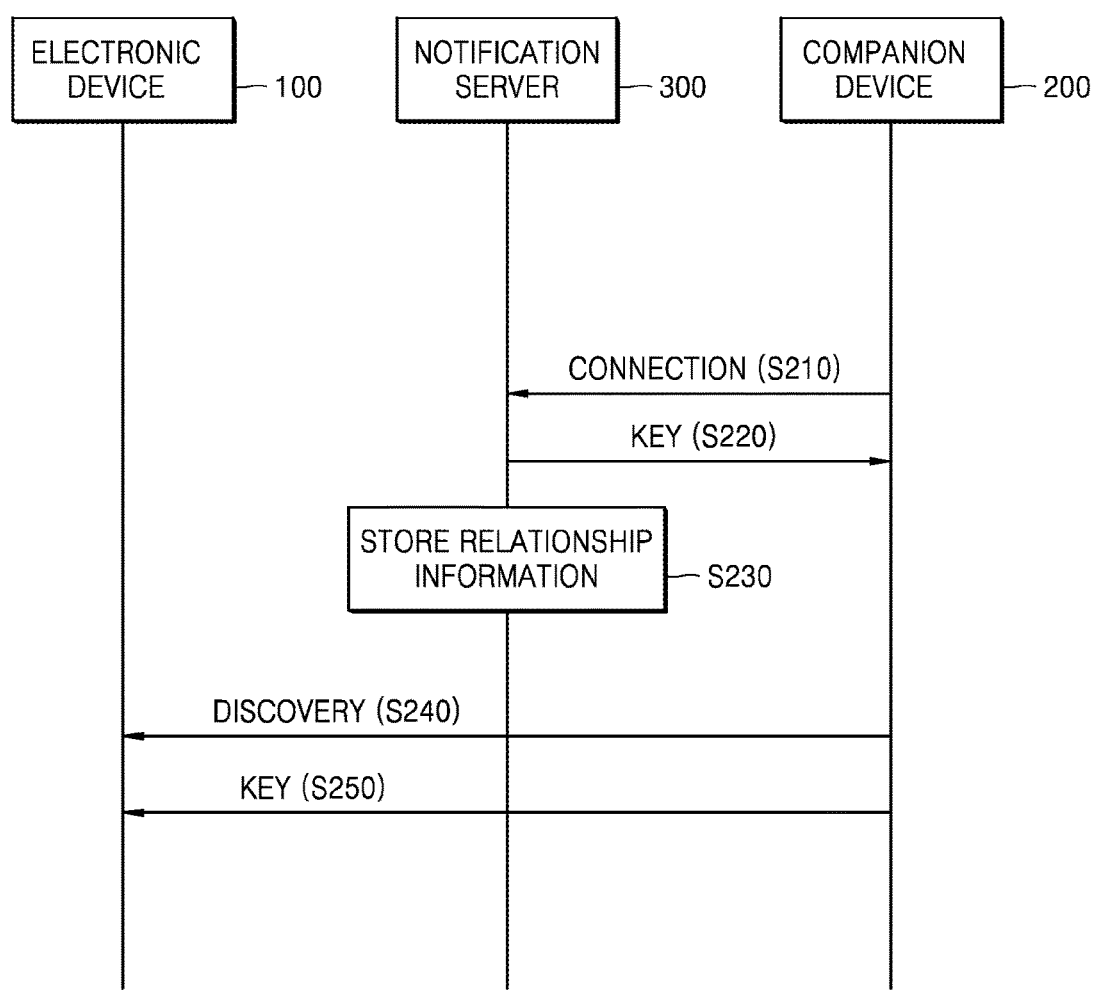
FIG. 8 is a flowchart illustrating an example method of sharing a key identifying a CS application of a companion device between an electronic device, a notification server, and the companion device, according to some example embodiments.

FIG. 8 is a flowchart illustrating an example method of sharing a key identifying a CS application of the companion device 200 between the electronic device 100, the notification server 300, and the companion device 200, according to some example embodiments.

Referring to FIG. 8, the companion device 200 may be connected to the notification server 300 (S210). The companion device 200 may be connected to the notification server 300 according to a protocol of the notification server 300. The companion device 200 may register a notification service allowing a notification with respect to the CS application in the notification server 300. In other words, the companion device 200 may allow the notification server 300 to receive the notification message with respect to the CS application.

The notification server 300 may acquire an ID of the companion device 200 and an ID of the CS application through a connection (S210) of the companion device 200. The notification server 300 may further acquire an ID of a user who uses the companion device 200. For example, the user ID may be used instead of the ID of the companion device 200.

The notification server 300 may transmit the key identifying the CS application of the companion device 200 to the companion device 200 (S220). The key may be information mapped to the ID of the companion device 200 and the ID of the CS application. The key may be further mapped to the user ID of the companion device 200. The notification server 300 may encrypt the key and may transmit the encrypted key to the companion device 200.

The notification server 300 may store relationship information between the key and the CS application of the companion device 200 (S230). The relationship information may be information indicating a relationship between the ID of the companion device 200 and the ID of the CS application corresponding to the key.

If the notification server 300 receives the notification message from the electronic device 100, the notification server 300 may compare the key included in the notification message and the stored relationship information and may identify the companion device 200 to which the notification message is to be transmitted and the CS application.

The companion device 200 that receives (S220) the key from the notification server 300 may discover the electronic device 100 which is to provide a notification. That is, the companion device 200 may discover a transmission party of the notification message In operation S240, when the companion device 200 operates as a CS, the electronic device 100 that is to interoperate with the companion device 200 may be discovered.

As an example of a discovery process, the companion device 200 may transmit a discovery packet so as to search for the electronic device 100 to receive the notification message through the notification server 300. The discovery packet may follow a simple service discovery protocol (SSDP), a multicast domain name system (mDNS), or a protocol supporting an automatic discovery of the electronic device 100. After transmitting the discovery packet, the companion device 200 may receive a response packet from the electronic device 100. As described above, the companion device 200 may discover the electronic device 100 by transmitting the discovery packet and receiving the response packet. However, the companion device 200 may discover the electronic device 100 by using a different scheme.

If an electronic device different from the electronic device 100 is present near the companion device 200, the companion device 200 may discover the different electronic device by receiving a response packet from the different electronic device.

The companion device 200 may transmit the key received from the notification server 300 to the discovered electronic device 100 (S250).

FIG. 8 illustrates an example method, but embodiments are not limited thereto, of sharing the key identifying the CS application of the companion device 200 between the electronic device 100, the notification server 300 and the companion device 200. The electronic device 100, the notification server 300 and the companion device 200 may share the key identifying the CS application by using various schemes.

FIG. 9 is a table illustrating an example of relationship information stored in a notification server, according to some example embodiments.

Referring to FIG. 9, the notification server may store the relationship information mapping a specific companion device and a specific application with a specific key. For example, a first key may be mapped to a first companion device and a first CS application, a second key may be mapped to the first companion device and a second CS application, and a third key may be mapped to a second companion device and the first CS application.

The notification server may map a different key according to an application in spite of the same companion device. The notification server may also map a key to not only a CS application of the companion device but also each of other applications of the companion device.

Figure 10:
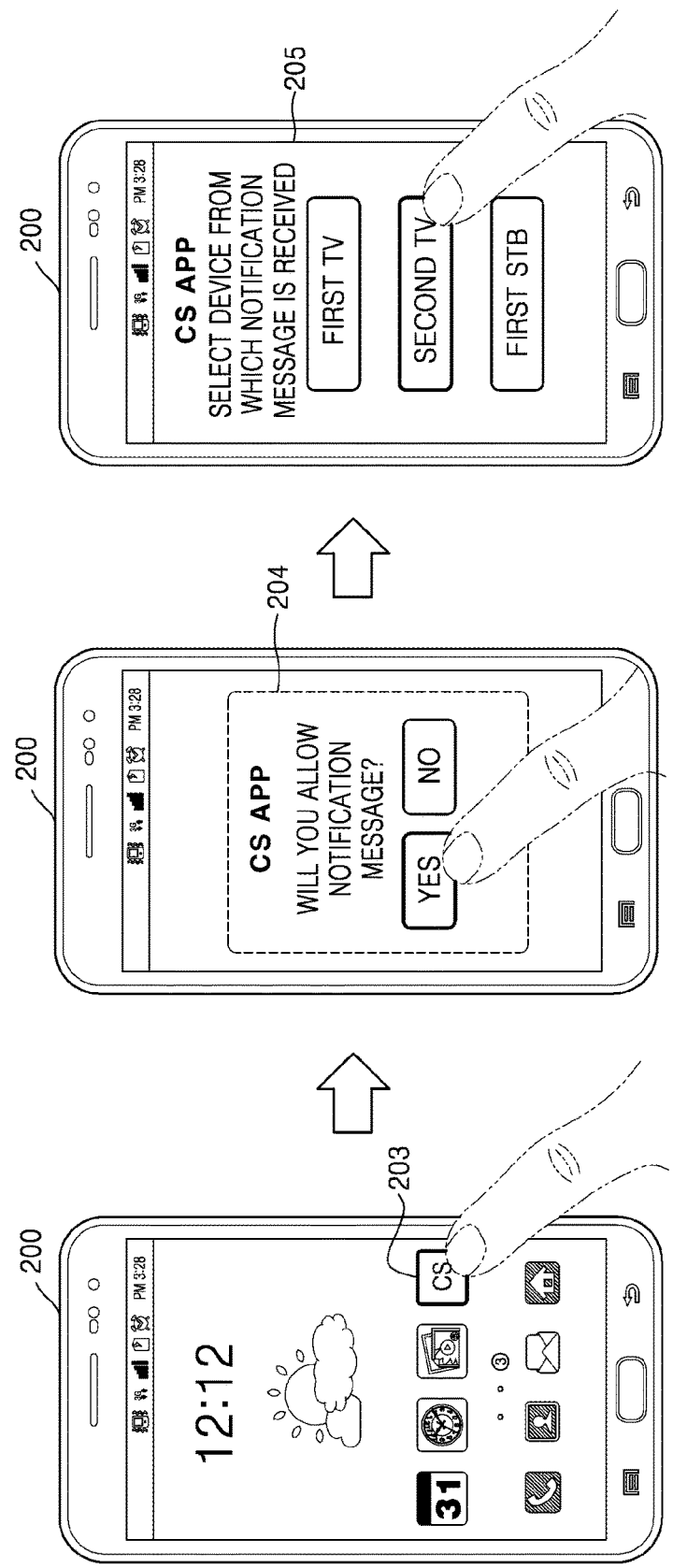
FIG. 10 is a diagram illustrating an example of an operation of a companion device when the method of sharing the key of FIG. 8 is performed.

FIG. 10 is a diagram illustrating an example of an operation of the companion device 200 when the method of sharing the key of FIG. 8 is performed.

Referring to FIGS. 8 and 10, the companion device 200 may execute a CS application 203 by receiving a request of the CS application 203 from a user. The companion device 200 may output a UI 204 for setting whether to allow a notification message. If the companion device 200 receives a user input of allowing the notification message through the UI 204, the companion device 200 may be connected to a notification server (S210 of FIG. 8) to register a notification service that allows a notification with respect of the CS application 203. The companion device 200 may receive a key identifying the CS application 203 of the companion device 200 from the notification server (S220).

The companion device 200 may discover an electronic device which is to provide the notification (S240 of FIG. 8). The companion device 200 may discover one or more electronic devices through a discovery process. The CS application 203 of the companion device 200 may perform the discovery process of the electronic device.

The companion device 200 may output a UI 205 for selecting the electronic device which is to provide the notification from among the discovered one or more electronic devices. The CS application 203 of the companion device 200 may output the U1205.

The user may select the electronic device which is to provide the notification through the UI 205. In FIG. 10, the user may select a second TV from among a first TV, the second TV, and a third TV. However, FIG. 10 is merely an example. The user may select one electronic device or multiple electronic devices from among the discovered one or more electronic devices as the electronic device which is to provide the notification.

However, FIG. 10 illustrates the example in which the user sets the notification message to be allowed with respect to the CS application 203. The user may not execute the CS application 203 and may set the notification message to be allowed with respect to the CS application 203 by setting the companion device 200.

Figure 11:
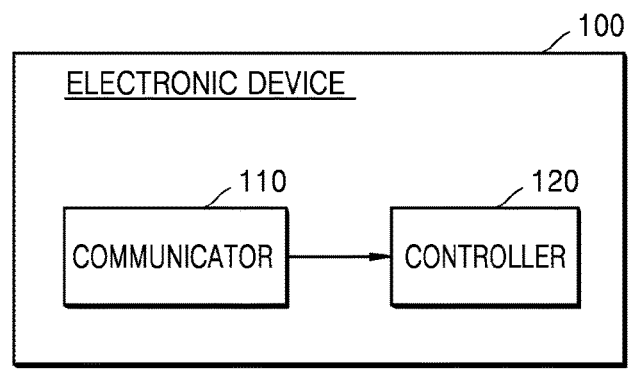
FIG. 11 is a block diagram illustrating an example electronic device according to some example embodiments.

FIG. 11 is a block diagram illustrating an example of electronic device 100 according to some example embodiments.

Referring to FIG. 11, the electronic device 100 may include a communicator (e.g., including communication circuitry) 110 and a controller 120.

The communicator 110 may use communication circuitry to communicate with various types of external devices by using various types of communication schemes. The communicator 110 may include a communication module for perform communication by using various types of communication schemes and communication circuitry. The communicator 110 may be connected to an A/V content provider over a broadcast network or through Internet.

The controller 120 may control an overall operation of the electronic device 100. In particular, the above-described operation of the electronic device 100 may be performed by the controller 120. Although a description of the operation of the electronic device 100 described before FIG. 11 is not redundantly described, the operation of the electronic device 100 may be performed by the electronic device 100 of FIG. 11, in particular, the controller 120. For example, the controller 120 may include a central processing unit (CPU), a microprocessor, a graphic processing unit (GPU), etc. but is not limited thereto.

The controller 120 may recognize a trigger for an execution request of a CS application for interoperation with a CS. The controller 120 may transmit a notification message including a key identifying the CS application of the companion device and information for calling the CS application to a notification server through the communicator 110.

The controller 120 may recognize receiving of information regarding the CS application including an ID of the CS application and the information for calling the CS application as the trigger. Alternatively, the controller 120 may recognize receiving of a user input requiring the controller 120 to use the CS as the trigger.

The controller 120 may select a key included in the notification message from among a plurality of previously stored keys based on the ID of the CS application. The controller 120 may generate the notification message including the selected key.

The information for calling the CS application included in the notification message may include address information for accessing resources on a network.

The controller 120 may receive the key identifying the CS application of the companion device from the companion device through the communicator 110.

The controller 120 may receive a discovery packet from the companion device through the communicator 110, may transmit a response packet to the companion device in response to the discovery packet, and may receive the key identifying the CS application of the companion device from the companion device.

The controller 120 may execute an HbbTV application that may interoperate with the CS application. The HbbTV application may recognize the trigger, may generate the notification message, and may transmit the notification message to the notification server.

The controller 120 may receive A/V content through the communicator 110. The information for calling the CS application included in the notification message may include address information for accessing resources on the network for receiving a service in association with the A/V content.

Figure 12:
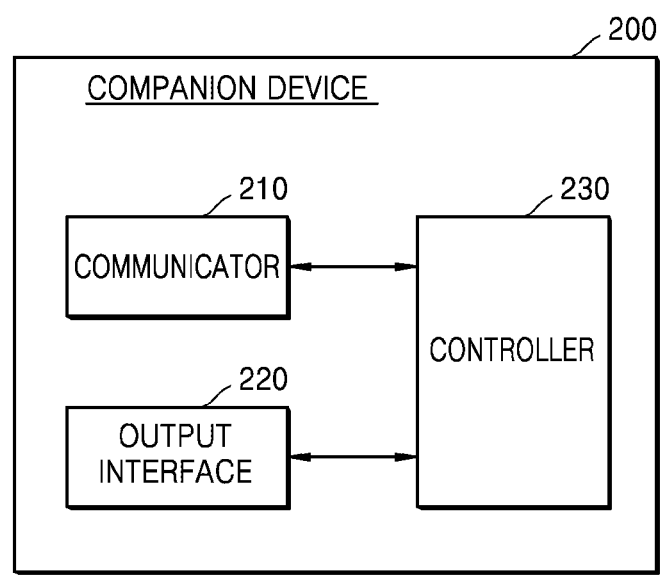
FIG. 12 is a block diagram illustrating an example companion device according to some example embodiments.

FIG. 12 is a block diagram illustrating an example of companion device 200 according to some example embodiments.

Referring to FIG. 12, the companion device 200 may include a communicator (e.g., including communication circuitry) 210, an output interface 220, and a controller 230.

The communicator 210 may use communication circuitry to communicate with various types of external devices by using various types of communication schemes. The communicator 210 may include a communication module for perform communication by using various types of communication schemes and communication circuitry. The communicator 210 may be connected to an A/V content provider through Internet. The communicator 210 may perform communication through communication circuitry with a notification server, an electronic device, etc.

The output interface 220 may include a speaker for outputting a sound signal and a display for outputting an image signal. The output interface 220 may output a UI for interaction with a user. The companion device 200 may further include an input interface receiving a user input.

The controller 230 may control an overall operation of the companion device 200. In particular, the above-described operation of the companion device 200 may be performed by the controller 230. Although a description of the operation of the companion device 200 described before FIG. 12 is not redundantly described, the operation of the companion device 200 may be performed by the companion device 200 of FIG. 12, in particular, the controller 230. For example, the controller 230 may include a CPU, a microprocessor, a GPU, etc. but is not limited thereto.

The controller 230 may register a notification service allowing a notification with respect to a CS application for using the companion device 200 as a CS in the notification server through the communicator 210. The controller 230 may receive a key identifying the CS application of the companion device from the notification server through the communicator 210. The controller 230 may discover an electronic device which is to provide the notification and may transmit the key to the discovered electronic device.

The controller 230 may execute the CS application. The CS application may discover one or more electronic devices and may output a UI for selecting the electronic device which is to provide the notification from the discovered one or more electronic devices through the communicator 220.

The controller 230 may receive a notification message with respect to the CS application from the notification server through the communicator 210. The controller 230 may output a UI for selecting whether to execute the CS application through the output interface 220.

The controller 230 may execute the CS application by a user input through the UI. The CS application may interoperate with the electronic device that transmits the notification message. The CS application may enable the companion device 200 to be used as a CS of the electronic device.

The notification message may include address information for accessing resources on a network for calling the CS application. The controller 230 may execute the CS application by accessing the address information included in the received notification message.

Figure 13:
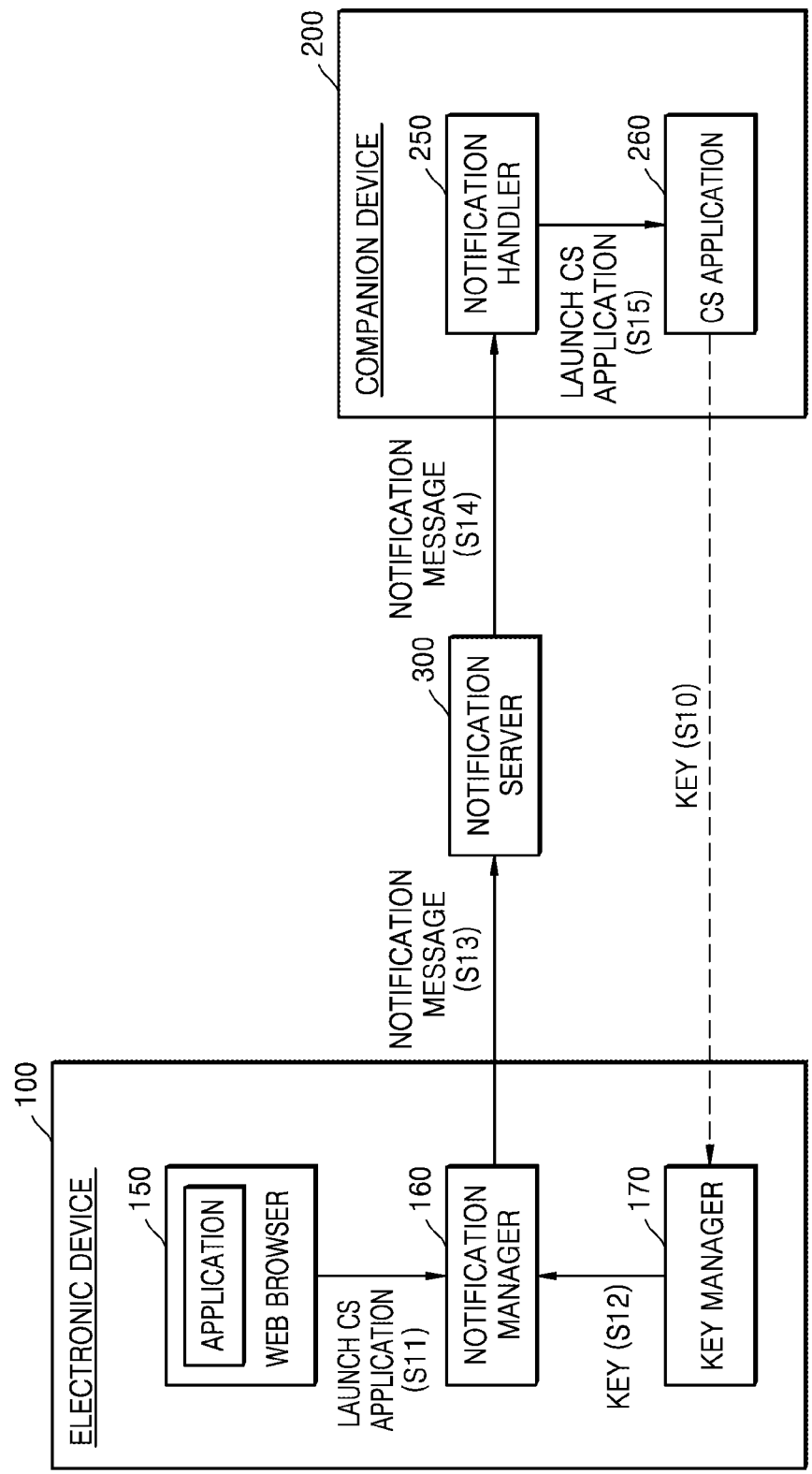
FIG. 13 is a flow block diagram illustrating example operations of an electronic device, a notification server, and a companion device, according to some example embodiments.

FIG. 13 is a flow block diagram illustrating example operations of the electronic device 100, the notification server 300, and the companion device 200, according to some example embodiments.

Referring to FIG. 13, the electronic device 100 may include a web browser 150, a notification manager 160, and a key manager 170. The web browser 150 may execute an HbbTV application. The HbbTV application, the web browser 150, the notification manager 160, and the key manager 170 may be programs stored in a memory of the electronic device 100 and may be executed by the controller (120 of FIG. 11). When the HbbTV application, the web browser 150, the notification manager 160, and the key manager 170 are executed by the controller (120 of FIG. 11), the HbbTV application, the web browser 150, the notification manager 160, and the key manager 170 may be loaded on a RAM of the electronic device 100. However, FIG. 13 is merely an implementation example. The notification manager 160 and the key manager 170 may be implemented as HbbTV applications.

The companion device 200 may include a notification handler 250 and a CS application 260. The CS application 260 may be an application executed by the web browser 150. Alternatively, the CS application 260 may be a native application. The native application may be an application executed on a specific platform of the companion device 200. For example, the platform may include Android, iOS, etc.

The notification handler 250 and the CS application 260 may be programs stored in a memory of the companion device 200 and may be executed by the controller (230 of FIG. 12). When the notification handler 250 and the CS application 260 are executed by the controller (230 of FIG. 12), the notification handler 250 and the CS application 260 may be loaded on a RAM of the companion device 200. However, FIG. 13 is merely an implementation example.

The CS application 260 of the companion device 200 may transmit a key identifying the CS application 260 of the companion device 200 to the key manager 170 of the electronic device 100 (S10). The key manager 170 may store and manage a plurality of keys (see FIG. 4).

The HbbTV application executed by the web browser 150 of the electronic device 100 may recognize a trigger of an execution request of the CS application 260. The HbbTV application may request the notification manager 160 to launch the CS application (S11).

The notification manager 160 may acquire the key identifying the CS application 260 of the companion device 200 from the key manager 170 to generate a notification message. The notification manager 160 may transmit the notification message (S13). The notification server 300 may transmit the notification message to the notification handler 250 of the companion device 200.

The notification handler 250 may output a UI for selecting whether to execute the CS application 260 based on the notification message. If a user input of selecting the execution of the CS application 260 is received, the notification handler 250 may launch the CS application 260.

Figure 14:
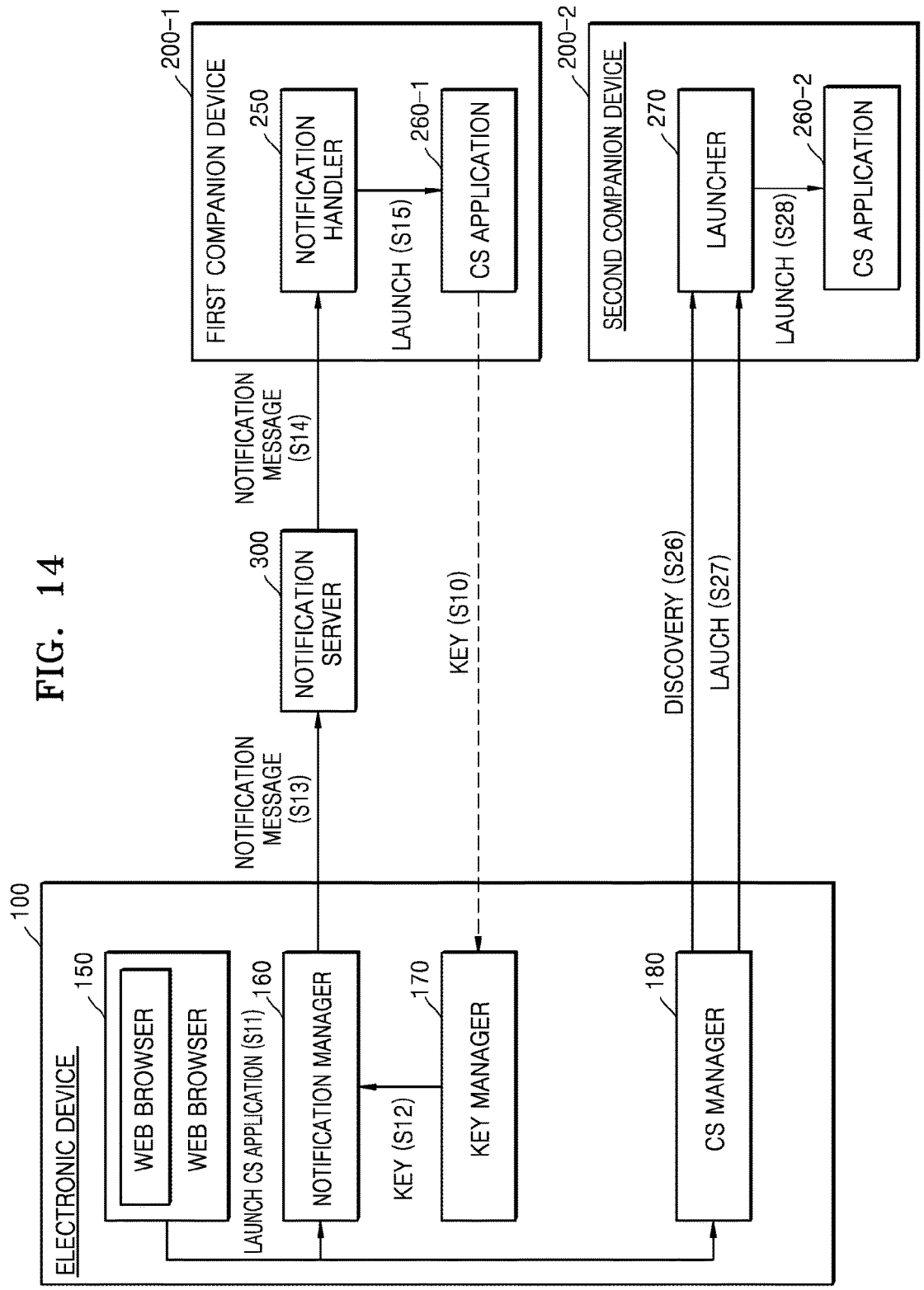
FIG. 14 is a flow block diagram illustrating an example method in which an electronic device interoperates with a companion device, according to some example embodiments.

FIG. 14 is a flow block diagram illustrating an example method in which the electronic device 100 interoperates with the companion device 200, according to some example embodiments.

Referring to FIG. 14, the electronic device 100 may further include a CS manager 180 in addition to a structure of FIG. 13. The CS manager 180 may be a program stored in a memory of the electronic device 100 and may be executed by the controller 120 of FIG. 11. The CS manager 180 may be loaded on a RAM of the electronic device 100 when executed by the controller 120 of FIG. 11. However, FIG. 14 is merely an implementation example. The CS manager 180 may be implemented as an HbbTV application.

A first companion device 200-1 is the same as the companion device 200 described with reference to FIG. 13, and thus a redundant description is omitted.

A second companion device 200-2 may include a launcher 270 and a CS application 260-2. The launcher 270 and the CS application 260-2 may be programs stored in a memory of the second companion device 200-2 and may be executed by the controller 230 of FIG. 12. The launcher 270 and the CS application 260-2 may be loaded on a RAM of the companion device 200 when executed by the controller 230 of FIG. 12.

The launcher 270 may communicate with the CS manager 180 of the electronic device 100 and may install or launch the CS application 260-2 of the second companion device 200-2. The launcher 270 may be a program resident in the second companion device 200-2.

If the HbbTV application executed by the web browser 150 of the electronic device 100 recognizes a trigger of an execution request of the CS application 260, the HbbTV application may request the notification manager 160 and the CS manager 180 to launch the CS application 260 (S11).

An operation between the electronic device 100 and the first companion device 200-1 is the same as described with reference to FIG. 13, and thus a redundant description thereof is omitted.

The CS manager 180 may discover the second companion device 200-2 that is executing the launcher 270 (S26). The CS manager may discover the second companion device 200-2 that is executing the launcher 270 by applying a discovery protocol. The launcher 270 may process the discovery protocol to allow the CS manager 180 to discover the second companion device 200-2. The launcher 270 needs to be resident in the RAM in order to process the discovery protocol.

The CS manager 180 may request the launcher 270 of the discovered second companion device 200-2 to launch the CS application 260-2 (S27). The launcher 270 may launch the CS application 260-2.

The first companion device 200-1 may not support a program resident in the RAM. For example, an operating system (OS) of the first companion device 200-1 may be an iOS but is not limited thereto. The first companion device 200-1 may not allow a launcher to be resident in the RAM. This means that although the first companion device 200-1 stores the launcher in a memory and executes the launcher through a controller, the first companion device 200-1 does not allow the launcher to be resident in the RAM. For example, when the first companion device 200-1 is executing another application or ends a screen, the launcher may not be executed.

When the launcher may not be resident in the RAM of the first companion device 200-1, if the first companion device 200-1 is executing the CS application 260-1, the electronic device 100 may discover the first companion device 200-1. However, if the first companion device 200-1 is not executing the CS application 260-1, the electronic device 100 may not discover the first companion device 200-1. Thus, there may be a problem in that the first companion device 200-1 is not interoperable with the electronic device 100.

According to some example embodiments, when the electronic device 100 transmits a notification message to the first companion device 200-1 by using the notification server 300, the electronic device 100 does not need to discover the first companion device 200-1. Thus, although the launcher is not resident in the RAM of the first companion device 200-1, there is no problem in interoperating the first companion device 200-1 with a CS. The first companion device 200-1 may receive the notification message without limitations of time and place. The first companion device 200-1 may receive the notification message from the electronic device 100 irrespective of whether the first companion device 200-1 is executing the CS application, irrespective of whether the first companion device 200-1 is at a near distance from the electronic device 100, or irrespective of whether the first companion device 200-1 includes the launcher. Thus, the first companion device 200-1 may be secured to be used as the CS.

Figure 15:
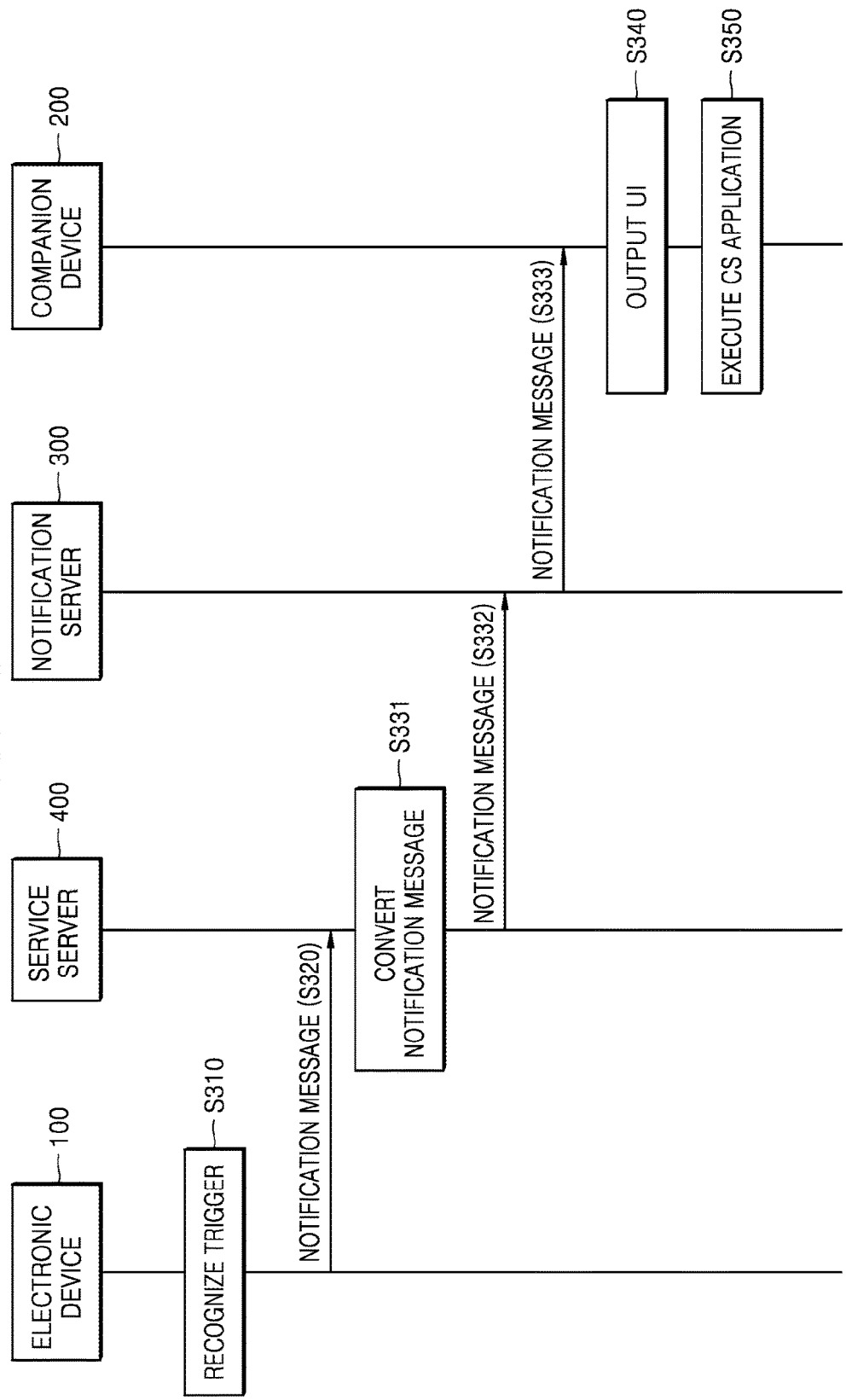
FIG. 15 is a flowchart illustrating an example method in which an electronic device transmits a notification message to a companion device, according to some example embodiments.

FIG. 15 is a flowchart illustrating an example method in which the electronic device 100 transmits a notification message to the companion device 200, according to some example embodiments. Upon comparing FIGS. 15 and 2, FIG. 15 which illustrates a service server 400 between the electronic device 100 and the companion device 200 is different from FIG. 2.

Referring to FIG. 15, the electronic device 100 may recognize a trigger for an execution request of a CS application (S310). The electronic device 100 may transmit the notification message to the service server 400 (S320). The electronic device 100 may transmit the notification message to the service server 400 to allow the notification message to be transmitted to the notification server 300.

When the electronic device 100 does not support a protocol of the notification server 300, the electronic device 100 may transmit the notification message to the notification sever 300 instead of the service server 400. For example, when a manufacturer of the electronic device 100 and a manufacturer of the companion device 200 are different from each other, the electronic device 100 may not support the protocol of the notification server 300. Alternatively, the electronic device 100 may support an initial protocol of the notification serve 300, whereas the electronic device 100 may not support an updated protocol of the notification serve 300.

The service server 400 may convert the notification message received from the electronic device 100 to a format according to the protocol of the notification server 300 (S331). That is, the service server 400 may act as a proxy.

The service server 400 may transmit the converted notification message to the notification server 300 (S332). The service server 400 may be connected to the notification server 300 according to the protocol of the notification server 300.

Operations S333, S340, and S350 after the notification server 300 receives the notification message are described with reference to FIG. 2, and thus redundant descriptions thereof are omitted.

Figure 16:
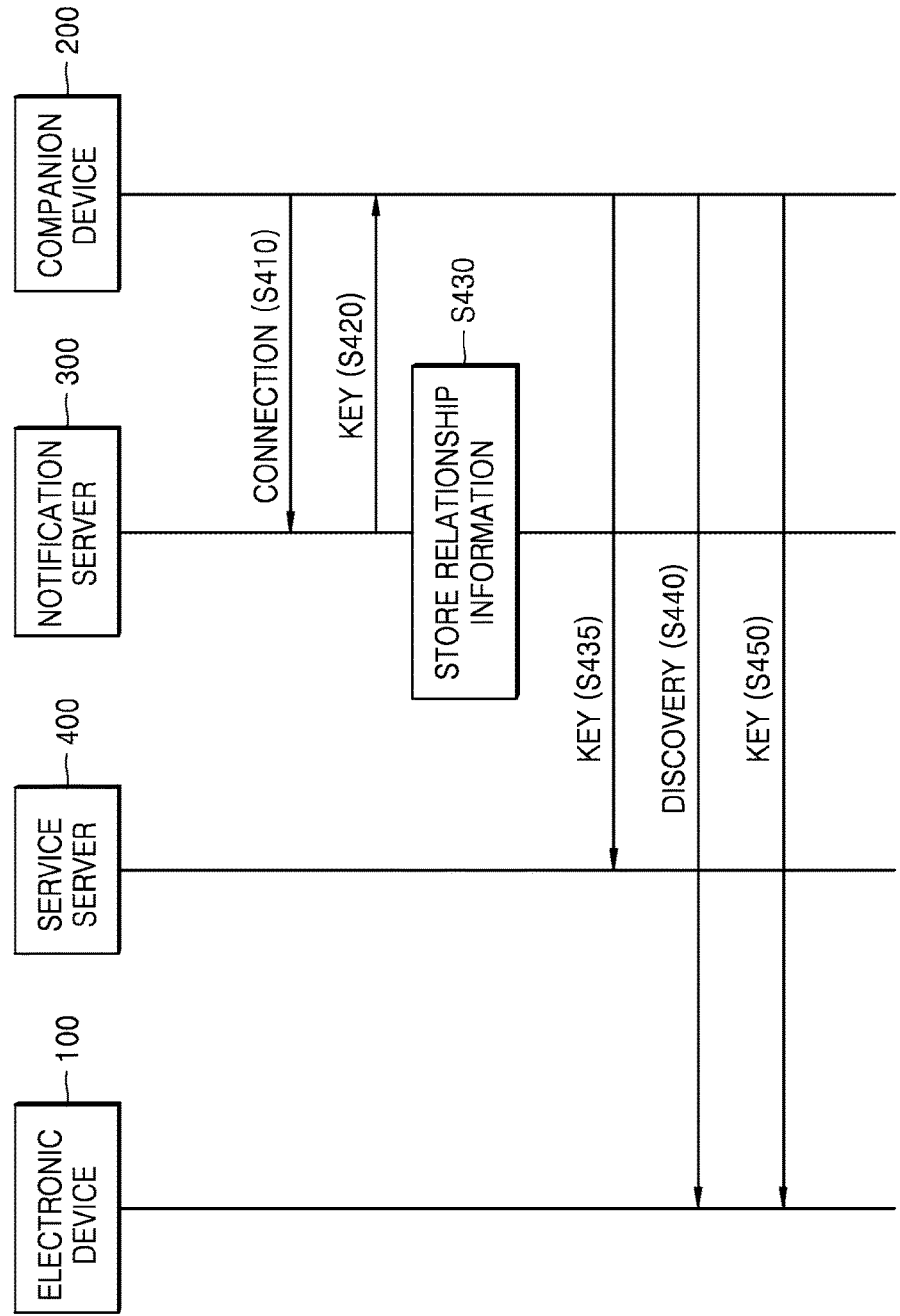
FIG. 16 is a flowchart illustrating an example method in which an electronic device, a service server, a notification server, and a companion device share a key identifying a CS application of the companion device, according to some example embodiments.

FIG. 16 is a flowchart illustrating an example method in which the electronic device 100, the service server 400, the notification server 300, and the companion device 200 share a key identifying a CS application of the companion device 200, according to some example embodiments. Upon comparing FIGS. 16 and 8, FIG. 16 which illustrates a service server 400 between the electronic device 100 and the companion device 200 is different from FIG. 8.

Referring to FIG. 16, the companion device 200 that receives the key from the notification server 300 may transmit the key to the service server 400 (S435). Thus, the service server 400 may also share the key of the companion device 200. Other operations S410, S420, S430, S440, and S450 are the same as described with reference to FIG. 8, and thus redundant descriptions thereof are omitted.

Figure 17:
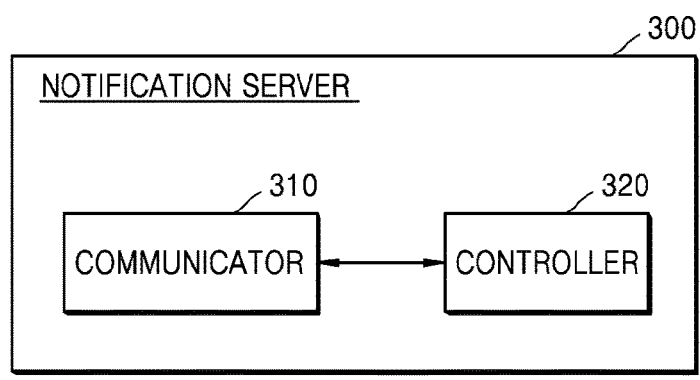
FIG. 17 is a block diagram illustrating an example notification server according to some example embodiments.

FIG. 17 is a block diagram illustrating an example of notification server 300 according to some example embodiments.

Referring to FIG. 17, the notification server 300 may include a communicator (e.g., including communication circuitry) 310 and a controller 320.

The communicator 310 may use communication circuitry to communicate with various types of external devices using various types of communication schemes and communication circuitry. The communicator 310 may include a communication module for perform communication by using various types of communication schemes and communication circuitry. The communicator 310 may communicate with an electronic device, a companion device, and a service server, etc.

The controller 320 may control an overall operation of the notification server 300. In particular, the above-described operation of the notification server 300 may be performed by the controller 320.

Although a description of an operation of the notification server 300 described before FIG. 17 is not redundantly described, the operation of the notification server 300 may be performed by, in particular, the controller 320. For example, the controller 320 may include a CPU, a microprocessor, a GPU, etc. but is not limited thereto.

The controller 320 may be connected to the companion device through the communicator 310 and may register a notification service allowing a notification with respect to a CS application of the companion device 200. The controller 320 may acquire an ID of the companion device and an ID of the CS application through a connection to the companion device. The controller 320 may further acquire an ID of a user who uses the companion device. For example, the user ID may be used instead of the ID of the companion device.

The controller 320 may transmit a key identifying the CS application of the companion device to the companion device. The key may be information mapped to the ID of the companion device and the ID of the CS application. The key may be further mapped to the user ID of the companion device. The controller 320 may encrypt the key and may transmit the encrypted key to the companion device.

The controller 320 may store relationship information between the key and the CS application of the companion device (see FIG. 9). The notification server 300 may further include a storage storing the relationship information.

The controller 320 may receive a notification message including the key from the electronic device through the communicator 310. The controller 320 may search for a companion device and a CS application that match the key from the relationship information. The controller 320 may transmit the notification message with respect to the CS application of the companion device to the companion device found based on the key.

The controller 320 may receive the notification message including the key from the service server through the communicator 310.

Figure 18:
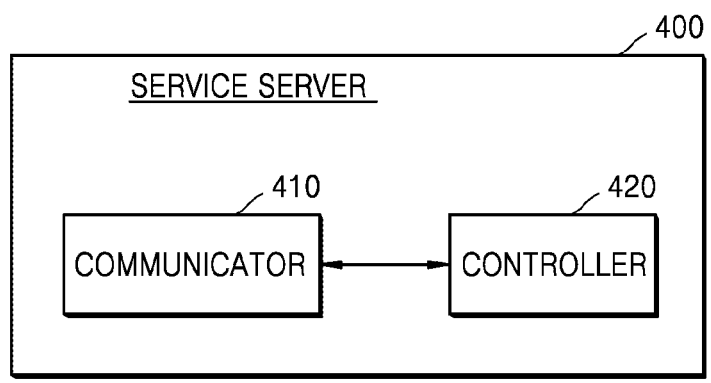
FIG. 18 is a block diagram illustrating an example service server according to some example embodiments.

FIG. 18 is a block diagram illustrating an example of the service server 400 according to some example embodiments.

Referring to FIG. 18, the service server 400 may include a communicator (e.g., including communication circuitry) 410 and a controller 420.

The communicator 410 may use communication circuitry to communicate with various types of external devices using various types of communication schemes and communication circuitry. The communicator 410 may include a communication module including various communication circuitry to perform communication using various types of communication schemes and communication circuitry. The communicator 410 may communicate with an electronic device, a companion device, and a notification server, etc.

The controller 420 may control an overall operation of the service server 400. In particular, the above-described operation of the service server 400 may be performed by the controller 420.

Although a description of an operation of the service server 400 described before FIG. 18 is not redundantly described, the operation of the service server 400 may be performed by, in particular, the controller 420. For example, the controller 420 may include a CPU, a microprocessor, a GPU, etc. but is not limited thereto.

The controller 420 may receive a key identifying a CS application of the companion device from the companion device through the communicator 410. The controller 420 may receive a notification message from the electronic device through the communicator 410. The controller 420 may convert the notification message received from the electronic device to follow a protocol of the notification server.

Figure 19:
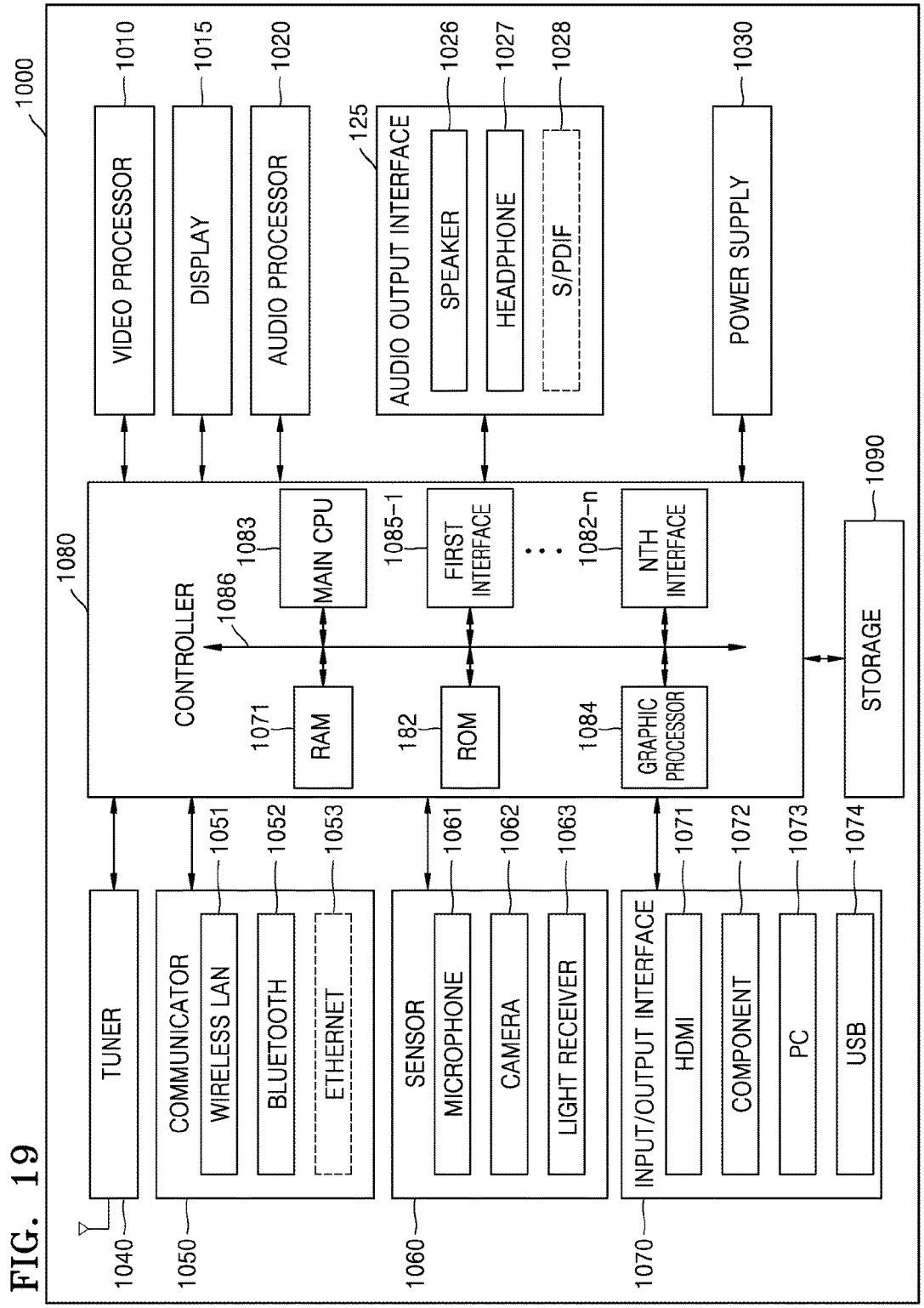
FIG. 19 is a block diagram illustrating an example configuration of an electronic device according to some example embodiments.

FIG. 19 is a block diagram illustrating an example configuration of an electronic device 1000 according to some example embodiments. The electronic device 1000 of FIG. 19 may be the electronic device 100 of previous figures. Thus, although a redundant description is not provided, a description of the electronic device 100 provided above may apply to the electronic device 1000 of FIG. 19.

Referring to FIG. 19, the electronic device 1000 may include a video processor 1010, a display 1015, an audio processor 1020, an audio output interface 1025, a power supply 1030, a tuner 1040, a communicator (e.g., including communication circuitry) 1050, a sensor 1060, an input/output interface (e.g., including input/output circuitry) 1070, a controller 180, and a storage 1090.

The video processor 1010 may perform processing on video data among A/V content received by the electronic device 1000. The video processor 1010 may perform various types of image processing, such as decoding, scaling, noise filtering, frame rate converting, resolution converting, etc., on the video data.

The display 1015 may display a video among A/V content included in a broadcast signal received through the tuner 1040 on a screen under control of the controller 1080. The display 1015 may also display A/V content (e.g., a moving image) input through the communicator 1050 or the input/output interface 1070. The display 1015 may output A/V content stored in the storage 1090 under control of the controller 1080. The display 1015 may also display a voice UI (e.g., including a voice command guide) for performing a voice recognition task corresponding to a voice recognition or a motion UI (e.g., including a user motion guide for a motion recognition) for performing a motion recognition task corresponding to a motion recognition.

According to some example embodiments, the controller 1080 may recognize a trigger for an execution request of a CS application for interoperation with a CS. The controller 1080 may transmit a notification message including a key identifying the CS application of a companion device and information for calling the CS application to a notification server through the communicator 1050.

According to some example embodiments, the controller 1080 may recognize receiving of information regarding the CS application including an ID of the CS application and the information for calling the CS application as the trigger. Alternatively, the controller 1080 may recognize receiving of a user input requiring the controller 1080 to use the CS as the trigger.

According to some example embodiments, the controller 1080 may select a key included in the notification message from among a plurality of previously stored keys based on the ID of the CS application. The controller 1080 may generate the notification message including the selected key.

The information for calling the CS application included in the notification message may include address information for accessing resources on a network.

According to some example embodiments, the controller 1080 may receive the key identifying the CS application of the companion device from the companion device through the communicator 1050.

According to some example embodiments, the controller 1080 may receive a discovery packet from the companion device through the communicator 1050, may transmit a response packet to the companion device in response to the discovery packet, and may receive the key identifying the CS application of the companion device from the companion device.

According to some example embodiments, the controller 1080 may execute an HbbTV application that may interoperate with the CS application. The HbbTV application may recognize the trigger, may generate the notification message, and may transmit the notification message to the notification server.

According to some example embodiments, the controller 1080 may receive A/V content through the communicator 1050. The information for calling the CS application included in the notification message may include address information for accessing resources on the network for receiving a service in association with the A/V content.

The audio processor 1020 may perform processing on audio data among the A/V content. The audio processor 1020 may perform various types of processing, such as decoding, amplifying, noise filtering, etc., on the audio data. The audio processor 1020 may include a plurality of audio processing modules to process an audio corresponding to a plurality of pieces of content.

The audio output interface 1025 may output an audio among the A/V content included in the broadcast signal received through the tuner 1040 under control of the controller 1080. The audio output interface 1025 may output an audio (e.g., a voice, a sound, or the like) input through the communicator 1050 or the input/output interface 1070. The audio output interface 1025 may output an audio stored in the storage 1090 under control of the controller 1080. The audio output interface 1025 may include at least one of a speaker 1026, a headphone output port 1027, and a Sony/Philips Digital Interface (S/PDIF) output port 1028. The audio output interface 1025 may include a combination of the speaker 1026, the headphone output port 1027, and the S/PDIF output port 1028.

The power supply 1030 may supply elements 1010 through 1090 of the electronic device 1000 with power input from an external power source under control of the controller 1080. The power supply 1030 may supply the elements 1010 through 1090 with power output from one battery (not shown) or two or more batteries (not shown) located in the electronic device 1000 under control of the controller 1080.

The tuner 1040 may amplify, mix, and resonate a broadcast signal received by wired or wirelessly to tune and select only a frequency of a channel that the electronic device 100 is to receive from many radio wave components. The broadcast signal may include an audio, a video, and additional information (e.g., an electronic program guide (EPG)).

The broadcast signal according to some example embodiments may include A/V content and application information.

The tuner 1040 may receive a broadcast signal in a frequency band corresponding to a channel number (e.g., Cable TV No. 506) according to a user input (e.g., a control signal received from a control device, e.g., a channel number input, an up-down input of a channel, a channel input on an EPG screen, or the like).

The tuner 1040 may receive a broadcast signal from various sources such as terrestrial broadcasting, cable broadcasting, satellite broadcasting, Internet broadcasting, etc. The tuner 1040 may receive a broadcast signal from a source such as an analog broadcast, a digital broadcast, or the like. The broadcast signal received through the tuner 1040 may be decoded (e.g., audio-decoded, video-decoded, or additional information-decoded) to be divided into an audio, a video and/or additional information. The divided audio, video, and/or additional information may be stored in the storage 1090 under control of the controller 1080.

The tuner 1040 of the electronic device 1000 may be one or plural. The tuner 1040 may be realized as an all-in-one type with the electronic device 100, an additional device (e.g., a set-top box (not shown)) having a tuner electrically connected to the electronic device 1000, or a tuner (not shown) connected to the input/output interface 1070.

The communicator 1050 may include various communication circuitry to connect the electronic device 1000 to an external device (e.g., an audio device or the like) under control of the controller 1080. The controller 1080 may transmit and/or receive content to/from an external device connected through the communicator 1050 and may download an application from the external device or may browse the web for the application.

The communicator 1050 may include various communication circuitry, including, for example, one or more of a wireless Local Area Network (LAN) 1051, Bluetooth 1052, and wired Ethernet 1053 in correspondence to a performance and a structure of the electronic device 1000. The communicator 1050 may include a combination of the wireless LAN 1051, the Bluetooth 1052, and the wired Ethernet 1053. The communicator 1050 may receive a control signal of a control device under control of the controller 1080. The control signal may be implemented as a Bluetooth type, a radio frequency (RF) signal type, or a WiFi type.

The communicator 1050 may further include additional communication circuitry, including, for example, near distance communication other than Bluetooth (for example, Near Field Communication (NFC) (not shown), Bluetooth Low Energy (BLE) (not shown).

In this regard, the communicator 1050 may use various communication circuitry, including, for example, at least one of Bluetooth, WiFi, BLE, laser beam communication, and infrared communication.

The sensor 1060 may sense a user's voice, an image of a user, or an interaction of the user.

A microphone 1061 may receive the voice uttered by the user. The microphone 1061 may convert the received voice into an electrical signal and output the electrical signal to the controller 1080. A user's voice may include a voice corresponding to a menu or a function of the electronic device 1000. A recognition range of the microphone 1061 may be recommended within a range of 4 m from the microphone 1061 to a location of the user and vary in correspondence to a volume of the user's voice and a surrounding environment (e.g., a speaker sound, surrounding noise, or the like).

The microphone 1061 may be realized as an all-in-one type with or a separate type from the electronic device 1000. The separate type microphone 1061 may be electrically connected to the electronic device 1000 through the communicator 1050 or the input/output interface 1070.

It will be easily understood by one of ordinary skill in the art that the microphone 1061 may be excluded according to a performance and a structure of the electronic device 1000.

A camera 1062 may receive an image (for example, continuous frames) corresponding to a motion of the user including a gesture within a camera recognition range. For example, the recognition range of the camera 1062 may range from about 0.1 to about 5 m from the camera 1062 to the user. The motion of the user may include, for example, a part of the user's body such as a user's face, an expression, a hand, a fist, a finger, etc. or a motion of the part of the user's body, etc. The camera 1062 may convert the received image into an electrical signal under control of the controller 1080 and may output the electrical signal to the controller 1080.

The controller 1080 may select a menu displayed on the electronic device 1000 by using a recognition result of a received motion or may perform a control operation in correspondence to the recognition result of the received motion. For example, the control operation may include channel adjustment, volume adjustment, and an indicator movement.

The camera 1062 may include a lens (not shown) and an image sensor (not shown). The camera 1062 may support an optical zoom or a digital zoom by using a plurality of lenses and image processing. The recognition range of the camera 1062 may be variously set according to an angle of the camera 1062 and a surrounding environment condition. If the camera 1062 includes a plurality of cameras, the camera 1062 may receive a 3D still image or a 3D motion by using the plurality of cameras.

The camera 1062 may be realized as an all-in-one type with or a separate type from the electronic device 1000. An additional device (not shown) including the separate type camera 1062 may be electrically connected to the electronic device 1000 through the communicator 1050 or the input/output interface 1070.

It will be easily understood by one of ordinary skill in the art that the camera 1062 may be excluded according to a performance and a structure of the electronic device 1000.

A light receiver 1063 may receive a light signal (including a control signal) from an external control device through a light window (not shown) of a bezel of the display 1015. The light receiver 1063 may receive the light signal corresponding to a user input (e.g., a touch, pressing, a touch gesture, a voice, or a motion) from the external control device. The control signal may be extracted from the received light signal under control of the controller 1080.

The input/output interface 1070 may receive a video (e.g., a moving image or the like), an audio (e.g., a voice, music, or the like), and additional information (e.g., an EPG or the like) from the outside of the electronic device 1000 under control of the controller 1080. The input/output interface 1070 may include one of a High-Definition Multimedia Interface (HDMI) port 1071, a component jack 1072, a PC port 1073, and a universal serial bus (USB) port 1074. The input/output interface 1070 may include a combination of the HDMI port 1071, the component jack 1072, the PC port 1073, and the USB port 1074.

It will be easily understood by those of ordinary skill in the art that a structure and an operation of the input/output interface 1070 may be variously realized according to embodiments.

The controller 1080 may control an overall operation of the electronic device 1000 and a signal flow between the elements 1010 through 1090 of the electronic device 1000, and perform a function of processing data. If there is a user input or a preset and stored condition is satisfied, the controller 1080 may execute an OS and various applications stored in the storage 1090.

The controller 1080 may include a random access memory (RAM) 1081 that stores a signal or data input from the outside of the electronic device 1000 or is used as a storage area corresponding to various jobs performed in the electronic device 1000, a read only memory (ROM) 1082 that stores a control program for controlling the electronic device 1000, and a processor 1083.

The processor 1083 may include a GPU (not shown) for processing a graphic corresponding to a video. The processor 1083 may be realized as a system on chip (SoC) into which a core (not shown) and the GPU (not shown) are integrated. The processor 1083 may include a plurality of processors.

A graphic processor 1084 may generate a screen including various objects, such as an icon, an image, a text, etc., by using a calculator (not shown) and a renderer (not shown).

First through $n^{th}$ interfaces 1085-1 through 1085-n may be connected to various elements described above. One of the first through $n^{th}$ interfaces 1085-1 through 1085-n may be a network interface that is connected to an external device through a network.

The RAM 1081, the ROM 1082, the processor 1083, the graphic processor 1084, and the first through $n^{th}$ interfaces 1085-1 through 1085-n may be connected to each other through an internal bus 1086.

The term of a controller of an electronic device in the present embodiment may include the processor 1083, the ROM 1082, and the RAM 1081.

It will be easily understood by those of ordinary skill in the art that a structure and an operation of the controller 1080 may be variously realized according to embodiments.

The storage 1090 may store various types of data, programs, or applications for driving and controlling the electronic device 1000 under control of the controller 1080. The storage 1090 may store input and/or output signals or data corresponding to driving of the video processor 1010, the display 1015, the audio processor 1020, the audio output interface 1025, the power supplier 1030, the tuner 1040, the communicator 1050, the sensor 1060, and the input/output interface 1070. The storage 1090 may store a control program for controlling the electronic device 1000 and the controller 1080, an application initially provided by a manufacturer or downloaded from an external source, a GUI related to the application, an object (e.g., an image text, an icon, a button, or the like) for providing the GUI, user information, a document, databases (DBs), or pieces of related data.

The term of a storage in an embodiment includes the storage 1090, the ROM 1082 and the RAM 1081 of the controller 1080, or a memory card (e.g., a micro secure digital (SD) card, a USB memory, or the like (not shown)) installed in the electronic device 1000. The storage 1090 may include a nonvolatile memory, a volatile memory, a hard disk drive (HDD), or a solid state drive (SSD).

The storage 1090 may include a broadcast reception module, a channel control module, a volume control module, a communication control module, a voice recognition module, a motion recognition module, a light reception module, a display control module, an audio control module, an external input control module, a power control module, a power control module of an external device connected by wireless (e.g., Bluetooth), a voice DB, or a motion DB, which are not shown. The controller 1080 may perform each function by using the software stored in the storage 1090.

Each of the modules may include commands for perform various functions provided by the electronic device 1000. One or ordinary skill in the art may intuitively infer functions of the modules from the names of the modules.

At least one of the elements 1010 through 1090 of the electronic device 1000 of FIG. 19 may be added or deleted according to the performance of the electronic device 1000. Also, it will be easily understood by one of ordinary skill in the art that locations of elements (e.g., 1010 through 1090) may be changed according to a performance or a structure of the electronic device 1000.

Figure 20:
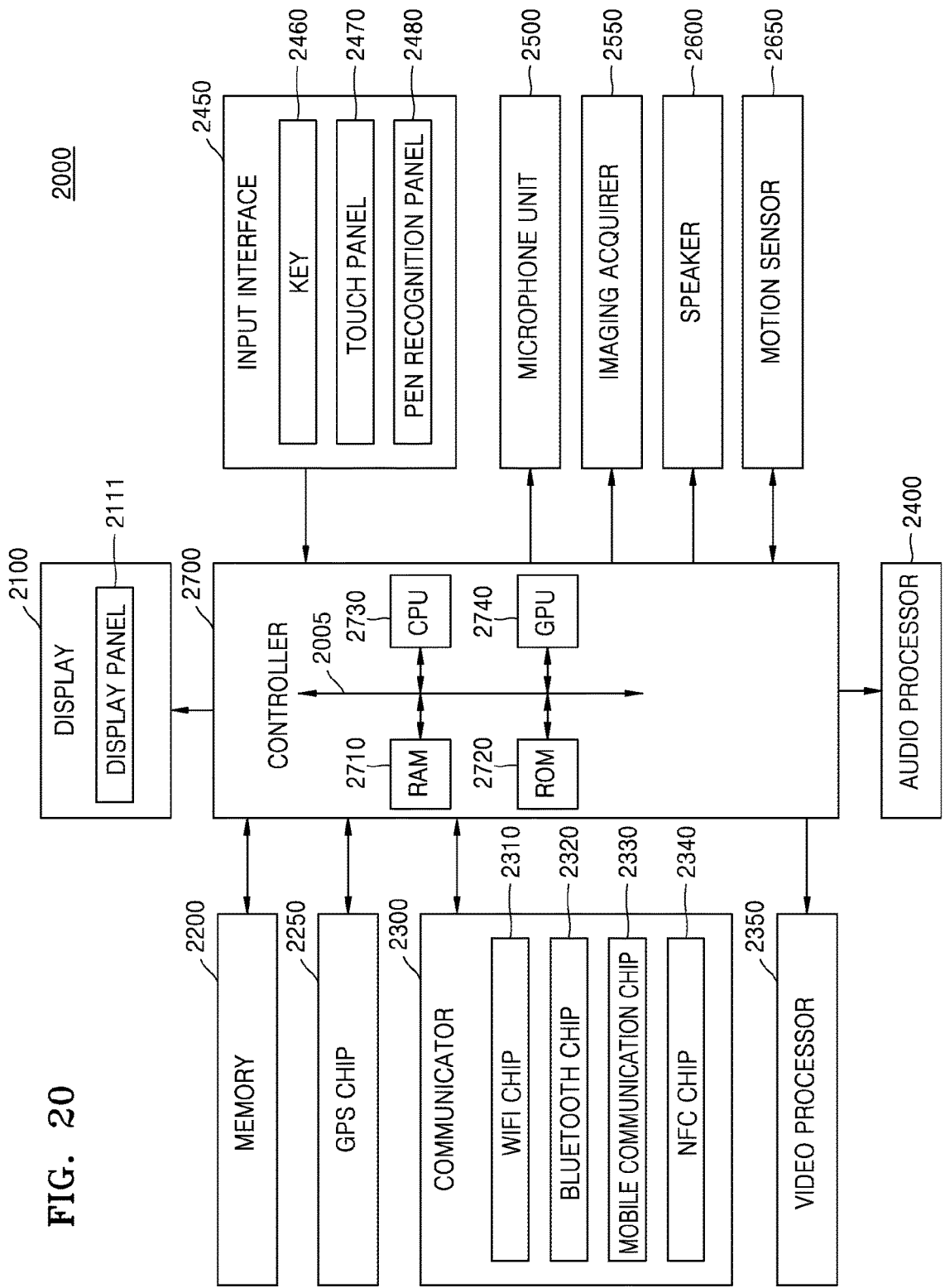
FIG. 20 is a block diagram illustrating an example configuration of a companion device according to some example embodiments.

FIG. 20 is a block diagram illustrating an example configuration of a companion device 2000 according to some example embodiments. The companion device 2000 of FIG. 20 may be the companion device 200 of previous figures. Thus, although a redundant description is not provided, a description of the companion device 200 provided above may apply to the companion device 2000 of FIG. 20.

As illustrated in FIG. 20, the configuration of the companion device 2000 may be applied to, for example, various types of devices such as a cellular phone, a tablet PC, a PDA, an MP3 player, a kiosk, an electronic picture frame, a navigation device, a digital TV, and a wearable device such as a wrist watch or a head-mounted display (HMD).

Referring to FIG. 20, the companion device 2000 may include at least one of a display 2100, a controller 2700, a memory 2200, a GPS chip 2250, a communicator (e.g., including communication circuitry) 2300, a video processor 2350, an audio processor 2400, an input interface (e.g., including input circuitry) 2450, a microphone 2500, an imaging acquirer 2550, a speaker 2600, and a motion sensor 2650.

The display 2100 may include a display panel 2110 and a controller (not shown) for controlling the display panel 2110. The display panel 2110 may be implemented as various types of displays such as a liquid crystal display (LCD), an organic light emitting diode (OLED) display, an active-matrix organic light-emitting diode (AM-OLED) display, and a plasma display panel (PDP). The display panel 2110 may be implemented as a flexible, transparent or wearable panel. The display 2100 may be provided as a touch screen (not shown) in combination with a touch panel 2470 of the user input interface 2450. For example, the touch screen (not shown) may include an integrated module in which the display panel 2110 and the touch panel 2470 are coupled to each other in a stack structure.

The memory 2200 may include at least one of an internal memory (not shown) and an external memory (not shown).

The internal memory, for example, may include at least one of a volatile memory (for example, a dynamic random access memory (RAM) (DRAM), a static RAM (SRAM), a synchronous DRAM (SDRAM), or the like), a non-volatile memory (for example, a one time programmable read only memory (ROM) (OTPROM), a programmable ROM (PROM), an erasable and programmable ROM (EPROM), an electrically erasable and programmable ROM (EEPROM), a mask ROM, a flash ROM, or the like), a hard disk drive (HDD), and a solid state drive (SSD). According to an embodiment, the controller 2700 may load a command or data received from at least one of a non-volatile memory or other elements to a volatile memory to process the loaded command or data. The controller 2700 may save data received or generated from other elements in the non-volatile memory.

The external memory, for example, may include at least one of a CompactFlash (CF), Secure Digital (SD), Micro Secure Digital (Micro-SD), Mini Secure Digital (Mini-SD), extreme Digital (xD), and a Memory Stick.

The memory 2200 may store various types of programs and data for use in the operation of the companion device 2000.

The controller 2700 according to some example embodiments may register a notification service allowing a notification with respect to a CS application for using the companion device 2000 as a CS in a notification server through the communicator 2300. The controller 2700 may receive a key identifying the CS application of the companion device 2000 from the notification server through the communicator 2300. The controller 2700 may discover an electronic device which is to provide the notification and may transmit the key to the discovered electronic device.

The controller 2700 according to some example embodiments may execute the CS application. The CS application may discover one or more electronic devices and may output a UI for selecting the electronic device which is to provide the notification from the discovered one or more electronic devices through the display 2100 and the speaker 2600.

The controller 2700 according to some example embodiments may receive a notification message with respect to the CS application from the notification server through the communicator 2300. The controller 2700 may output a UI for selecting whether to execute the CS application through the display 2100 and the speaker 2600.

The controller 2700 according to some example embodiments may execute the CS application by a user input through the UI. The CS application may interoperate with the electronic device that transmits the notification message. The CS application may enable the companion device 2000 to be used as a CS of the electronic device.

The notification message according to some example embodiments may include address information for accessing resources on a network for calling the CS application. The controller 2700 may execute the CS application by accessing the address information included in the received notification message.

The controller 2700 may control the display 2100 to display some of content stored in the memory 2200. In other words, the controller 2700 may display some of the content stored in the memory 2200 on the display 2100. Alternatively, the controller 2700 may perform a control operation corresponding to a gesture of a user when the gesture of the user is made in one region of the display 2100.

The controller 2700 may include at least one of a RAM 2710, a ROM 2720, a CPU 2730, a GPU 2740, and a bus 2750. The RAM 2710, the ROM 2720, the CPU 2730, and the GPU 2740 may be connected to each other through the bus 2750.

The companion device 2000 according to some embodiments may not allow a program resident in the RAM 2710.

The CPU 2730 may access the memory 2200 to perform booting using an OS stored in the memory 2200. The CPU 2730 may perform various operations by using various types of programs, content, data, and the like stored in the memory 2200.

The ROM 2720 may store a set of commands for system booting, etc. For example, if a turn-on command is input and power is supplied to the companion device 2000, the CPU 2730 may copy the OS stored in the memory 2200 onto the RAM 2710 according to the command stored in the ROM 2720 and boot a system by executing the OS. When the booting is completed, the CPU 2730 may copy various programs stored in the memory 2200 onto the RAM 2710 and perform various operations by executing the programs copied in the RAM 2710. When the booting of the companion device 2000 is completed, the GPU 2740 may display a UI screen on a region of the display 2100. In detail, the GPU 2740 may generate a screen on which an electronic document including various objects such as content, an icon, and a menu is displayed. The GPU 2740 may calculate attribute values such as coordinate values, forms, sizes, and colors in which objects are to be displayed according to a layout of the screen. The GPU 2740 may generate a screen of various layouts including objects based on the calculated attribute values. The screen generated from the GPU 2740 may be provided to the display 2100 and may be displayed on each region of the display 2100.

The GPS chip 2250 may receive a GPS signal from a GPS satellite and calculate a current position of the companion device 2000. When a navigation program is used or when a current location of the user is necessary, the controller 2700 may calculate the location of the user using the GPS chip 2250.

The communicator 2300 may include various communication circuitry to communicate with various types of external devices according to various types of communication schemes. The communicator 2300 may include various communication circuitry, such as, for example, at least one of a Wireless Fidelity (Wi-Fi) chip 2310, a Bluetooth chip 2320, a wireless communication chip 2330, and a NFC chip 2340. The controller 2700 may communicate with various types of external devices using the communicator 2300.

The Wi-Fi chip 2310 and the Bluetooth chip 2320 may perform communication using a Wi-Fi scheme and a Bluetooth scheme, respectively. When the Wi-Fi chip 2310 or the Bluetooth chip 2320 is used, the communicator 2300 may transmit and receive various types of information after transmitting and receiving various types of connection information such as a service set identifier (SSID) and a session key and connecting communication using the connection information. The wireless communication chip 2330 is a chip for performing communication according to various communication standards such as Institute of Electrical and Electronics Engineers (IEEE), Zigbee, $3^{rd}$ Generation (3G), $3^{rd}$ Generation Partnership Project (3GPP), and Long Term Evolution (LTE). The NFC chip 2340 is a chip operating in an NFC scheme using a band of about 13.56 MHz among various radio frequency identification (RFID) frequency bands such as about 135 kHz, 13.56 MHz, 433 MHz, 860 to 960 MHz, and 2.45 GHz.

The video processor 2350 may process video data included in content received through the communicator 2300 or content stored in the memory 2200. The video processor 2350 may perform various types of image processing such as decoding, scaling, noise filtering, frame rate converting, and resolution converting on the video data.

The audio processor 2400 may process audio data included in content received through the communicator 2300 or content stored in the memory 2200. The audio processor 2400 may perform various types of processing such as decoding, amplification, and noise filtering on the audio data.

When a program for reproducing multimedia content is executed, the controller 2700 may drive the video processor 2350 and the audio processor 2400 to reproduce the multimedia content. The speaker 2600 may output the audio data generated by the audio processor 2400.

The input interface 2450 may receive various commands from the user. The input interface 2450 may include various input circuitry, such as, for example, at least one of a key 2460, a touch panel 2470, and a pen recognition panel 2480.

The key 2460 may include various types of keys such as a mechanical button and a wheel formed in various regions such as front, side, and rear surface portions of the exterior of the main body of the companion device 2000.

The touch panel 2470 may detect the user's touch input and output a touch event value corresponding to a detected touch signal. When the touch panel 2470 constitutes a touch screen (not shown) in combination with the display panel 2110, the touch screen may be implemented as various types of touch sensors such as capacitive, resistive, and piezoelectric sensors. The capacitive sensor calculates touch coordinates by detecting micro electricity excited by a user's body when part of the user's body touches the surface of the touch screen by using a dielectric coated on the surface of the touch screen. The resistive sensor includes two electrode plates embedded in the touch screen, and detects that an electric current flows due to the contact between the upper and lower plates of the touched point to calculate touch coordinates when the user touches the screen. Although a touch event may be mainly generated by a human finger in the touch screen, the touch event may also be generated by a conductive material capable of giving a change in electrostatic capacitance.

The pen recognition panel 2480 may detect a proximity input or a touch input of a pen according to an operation of a touch pen (for example, a stylus pen or a digitizer pen) of the user and output the detected pen proximity event or pen touch event. The pen recognition panel 2480, for example, may be implemented in an electron magnetic resonance (EMR) method, and detect a touch or a proximity input according to a change in the intensity of an electromagnetic field by the proximity or touch of the pen. In detail, the pen recognition panel 2480 may be configured to include an electronic induction coil sensor (not shown) having a grid structure and an electronic signal processor (not shown) for sequentially providing an alternating current (AC) signal having a predetermined frequency to each loop coil of the electronic induction coil sensor. When there is a pen including a built-in resonant circuit in the vicinity of a loop coil of the pen recognition panel 2480, a magnetic field transmitted from the corresponding loop coil generates an electric current based on the mutual electromagnetic induction in the resonant circuit within the pen. Based on the electric current, an inductive magnetic field is generated from a coil constituting the resonant circuit of the pen, and the pen recognition panel 2480 may detect the inductive magnetic field from a loop coil which is in the state of receiving a signal to detect a proximity position or a touch position of the pen. The pen recognition panel 2480 may be provided to have a given area in the lower portion of the display panel 2110, for example, an area capable of covering a display region of the display panel 2110.

The microphone 2500 may receive the user's voice or another sound and convert the received voice or sound into audio data. The controller 2700 may use the user's voice input through the microphone 2500 in a call operation or convert the voice into audio data so that the audio data may be stored in the memory 2200.

The imaging acquirer 2550 may image a still image or a moving image according to control of the user. The imaging acquirer 2550 may be implemented in plural like front and rear surface cameras.

When the imaging acquirer 2550 and the microphone 2500 are provided, the controller 2700 may perform a control operation according to the user's voice input through the microphone 2500 or the user's motion recognized by the imaging acquirer 2550. For example, the companion device 2000 may operate in a motion control mode or a voice control mode. When the companion device 2000 operates in the motion control mode, the controller 2700 may image the user by activating the imaging acquirer 2550 and track a change in the user's motion to perform a control operation corresponding to the tracked change. When the companion device 2000 operates in the voice control mode, the controller 2700 may operate in a voice recognition mode in which the user's voice input through the microphone 2500 is analyzed and the control operation is performed according to the analyzed user voice.

The motion sensor 2650 may sense a motion of the main body of the companion device 2000. The companion device

2000 may rotate or tilt in various directions. At this time, the motion sensor 2650 may sense motion characteristics such as a rotation direction, an angle, and a slope by using at least one of various sensors such as a geomagnetic sensor, a gyro sensor, and an acceleration sensor.

In addition, the companion device 2000 may further include a Universal Serial Bus (USB) port to be connected with a USB connector, various external input ports to be connected to various external ports such as a headset, a mouse, a LAN, etc., and a Digital Multimedia Broadcasting (DMB) chip to receive and process a DMB signal, various sensors, etc.

The names of the above-described elements of the companion device 2000 may differ. The companion device 2000 according to the present disclosure may be configured to include at least one of the above-described elements, and may not include some elements or may further include other additional elements.

Meanwhile, the some example embodiments described above may be written as a computer-executable program, and may be implemented in a general-use digital computer which runs the program by using a computer-readable recording medium.

The computer-readable recording medium includes storage media, such as a magnetic storage medium (e.g., a ROM, a floppy disk, and a hard disk), and an optical storage medium (e.g., a CD-ROM and a DVD).

It should be understood that the various example embodiments described herein should be considered in a descriptive sense only and not for purposes of limitation. Descriptions of features or aspects within each embodiment should typically be considered as available for other similar features or aspects in other embodiments.

While one or more example embodiments have been described with reference to the figures, it will be understood by those of ordinary skill in the art that various changes in form and details may be made therein without departing from the spirit and scope as defined by the following claims.

What is claimed is:

1. An electronic device comprising:
   a communicator including communication circuitry; and
   a controller configured to:
      store a plurality of keys which are shared between companion devices and a notification server, each key comprising a companion device identifier and an application identifier;
      recognize a trigger for an execution request of the application for interoperating with a companion screen;
      in response to the recognizing of the trigger, automatically selecting, from among the stored plurality of keys, one or more keys having the application identifier which is identical to the identifier of the application corresponding to the execution request;
      generate one or more notification messages corresponding to the selected one or more keys, each of the one or more notification messages including corresponding key and information for calling the application; and
      transmit the one or more notification messages to a notification server that provides a notification service with respect to the application to the one or more companion devices.

2. The electronic device of claim 1, wherein the controller is further configured to recognize, as the trigger, receiving of information regarding the application including an ID of the application and the information for calling the application or receiving of an input requiring the electronic device to use the companion screen.

3. The electronic device of claim 1, wherein the information for calling the application included in the notification message comprises address information for accessing resources on a network.

4. The electronic device of claim 1, wherein the each key comprises an user identification for identifying the user of the companion device.

5. The electronic device of claim 1, wherein the controller is further configured to receive a discovery packet from the companion device, to transmit a response packet to the companion device in response to the discovery packet, and to receive the key from the companion device, through the communication circuitry of the communicator.

6. The electronic device of claim 1, wherein the controller is further configured to execute a second application interoperable with the application, and
   wherein the second application is configured to recognize the trigger, to generate the notification message, and to transmit the notification message to the notification server.

7. The electronic device of claim 6, wherein the second application is further configured to discover a second companion device executing a launcher and to request the launcher of the discovered second companion device to execute the application.

8. The electronic device of claim 1, wherein the controller is further configured to transmit the notification message to a service server to allow the notification message to be transmitted to the notification server, and
   wherein the service server is configured to convert the notification message received from the controller to a format based on a protocol of the notification server and to transmit the converted notification message to the notification server.

9. The electronic device of claim 1, wherein the controller is further configured to receive audio/video (A/V) content through the communication circuitry of the communicator, and
   wherein the information for calling the application comprises address information for accessing resources on a network for receiving a service in association with the A/V content.

10. A companion device comprising:
    a communicator comprising communication circuitry; and
    a controller configured to:
       register a notification service allowing a notification with respect to an application for using the companion device as a companion screen in a notification server through the communication circuitry of the communicator,
       receive a key identifying the application of the companion device from the notification server,
       discover an electronic device which is to provide the notification, and
       transmit the key, which is received from the notification server and is shared between the companion device and the notification server, to the discovered electronic device, the key comprising a companion device identifier and an application identifier.

11. The companion device of claim 10, further comprising: an output interface,
    wherein the controller is further configured to execute the application, and wherein the application is configured to:
discover one or more electronic devices, and
output a user interface (UI) comprising a list of the one or more electronic devices which are discovered,
receiving a selection of one or more electronic devices from the list, and
transmit the key to the selected one or more electronic devices.

12. The companion device of 11, wherein the controller is further configured to receive a notification message with respect to the application from the notification server through the communication circuitry of the communicator and to output a UI for selecting whether to execute the application through the output interface.

13. The companion device of 12, wherein the application is further configured to interoperate with the electronic device that transmits the notification message if the controller executes the application according to an input received through the UI.

14. The companion device of 12, wherein the notification message includes address information for accessing resources on a network for calling the application, and
wherein the controller is further configured to execute the application by accessing the address information.

15. A method of operating an electronic device, the method comprising:
storing a plurality of keys, which are shared between a companion devices and a notification server, each key comprising a companion device identifier and an application identifier;
recognizing a trigger for an execution request of the application for interoperating with a companion screen; and
in response to the recognizing of the trigger, automatically selecting from among the stored plurality of keys, one or more keys having the application identifier which is identical to the identifier of the application corresponding to the execution request;
generating one or more notification messages corresponding to the selected one or more keys, each of the one or more notification messages including corresponding key information and information for calling the application; and
transmitting the one or more notification messages to a notification server that provides a notification service with respect to the application of the one or more companion devices.

16. The method of claim 15, wherein the each key comprises an user identification for identifying the user of the companion device.

17. The method of claim 15, further comprising:
executing a second application interoperable with the application;
recognizing the trigger, wherein the recognizing is performed by the second application; and
generating the notification message and transmitting the notification message to the notification server, wherein the generating and the transmitting is performed by the second application.

18. The method of claim 17, further comprising:
discovering a second companion device that is executing a launcher, wherein the discovering is performed by the second application; and
requesting the launcher of the discovered second companion device to execute the application, wherein the requesting is performed by the second application.

19. A non-transitory computer-readable recording medium having recorded thereon a computer program for executing the method of claim 15.

* * * * *

UNITED STATES PATENT AND TRADEMARK OFFICE
CERTIFICATE OF CORRECTION

| | | |
|---|---|---|
| PATENT NO. | : 10,277,961 B2 | Page 1 of 1 |
| APPLICATION NO. | : 15/218260 | |
| DATED | : April 30, 2019 | |
| INVENTOR(S) | : Ji-min Chung et al. | |

It is certified that error appears in the above-identified patent and that said Letters Patent is hereby corrected as shown below:

On the Title Page

Item (73) Assignees should read:
--Samsung Electronics, Co., Ltd.,
Suwon-si, Gyeonggi-do (KR);
Korean Electronics Technology Institute
Seongnam-si, Gyeonggi-do (KR)--

Signed and Sealed this
Thirtieth Day of December, 2025

John A. Squires
*Director of the United States Patent and Trademark Office*